United States Patent
Hoang et al.

(10) Patent No.: US 12,082,192 B2
(45) Date of Patent: Sep. 3, 2024

(54) NR V2X—METHODS FOR DATA TRANSMISSION IN WIRELESS SYSTEMS

(71) Applicant: INTERDIGITAL PATENT HOLDINGS, INC., Wilmington, DE (US)

(72) Inventors: Tuong Duc Hoang, Montreal (CA); Tao Deng, Roslyn, NY (US); Martino M. Freda, Laval (CA); Aata El Hamss, Laval (CA); Benoit Pelletier, Roxboro (CA); Chunxuan Ye, San Diego, CA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 129 days.

(21) Appl. No.: 17/265,563

(22) PCT Filed: Aug. 6, 2019

(86) PCT No.: PCT/US2019/045265
§ 371 (c)(1),
(2) Date: Feb. 3, 2021

(87) PCT Pub. No.: WO2020/033381
PCT Pub. Date: Feb. 13, 2020

(65) Prior Publication Data
US 2021/0243749 A1    Aug. 5, 2021

Related U.S. Application Data

(60) Provisional application No. 62/715,659, filed on Aug. 7, 2018, provisional application No. 62/736,287, filed
(Continued)

(51) Int. Cl.
*H04W 24/08*    (2009.01)
*H04W 28/26*    (2009.01)
(Continued)

(52) U.S. Cl.
CPC ........... *H04W 72/20* (2023.01); *H04W 24/08* (2013.01); *H04W 28/26* (2013.01); *H04W 4/40* (2018.02); *H04W 74/0816* (2013.01)

(58) Field of Classification Search
CPC ......... H04W 72/1289; H04W 72/1242; H04W 72/1284; H04W 72/10; H04W 72/1263; H04W 72/02
See application file for complete search history.

(56) References Cited

U.S. PATENT DOCUMENTS 10,531,460 B2    1/2020  Chae et al.
2018/0084478 A1*  3/2018  Lee ....................... H04W 28/12
(Continued)

FOREIGN PATENT DOCUMENTS

EP       3550905 A1    10/2019
WO    2018/030825      2/2018
WO    2018031086 A1    2/2018

OTHER PUBLICATIONS

Huawei et al., "UE autonomous resource selection based on sensing," 3GPP TSG RAN WG2 Meeting #95, R2-164878, Gothenburg, Sweden (Aug. 22-26, 2016).
(Continued)

*Primary Examiner* — Syed Ali
(74) *Attorney, Agent, or Firm* — Volpe Koenig

(57) ABSTRACT

A method and apparatus for selecting a resource for transmission may be performed by a WTRU. The method may comprise determining a priority of a data packet and determining a CBR of a resource pool. The WTRU may set a backoff counter to an initial backoff value, in accordance with at least one of the priority of the packet or the CBR. A CCA may be performed in a plurality of resource slots to determine whether the resource slots are available. The backoff counter may be decreased by the number of available resources in each slot. When the backoff counter
(Continued)

reaches a threshold value, which may be set at 0, the resource for transmission may be randomly selected. The WTRU may then transmit data to another WTRU on the randomly selected resource.

10 Claims, 15 Drawing Sheets

Related U.S. Application Data on Sep. 25, 2018, provisional application No. 62/752,787, filed on Oct. 30, 2018, provisional application No. 62/789,861, filed on Jan. 8, 2019, provisional application No. 62/840,793, filed on Apr. 30, 2019.

(51) Int. Cl.
  *H04W 72/20* (2023.01)
  *H04W 4/40* (2018.01)
  *H04W 74/0816* (2024.01)

(56) References Cited

U.S. PATENT DOCUMENTS

| | | | |
|---|---|---|---|
| 2018/0098322 | A1 | 4/2018 | Yoon |
| 2018/0206260 | A1* | 7/2018 | Khoryaev ............ H04W 72/56 |
| 2018/0242190 | A1* | 8/2018 | Khoryaev ......... H04W 28/0284 |
| 2019/0124491 | A1* | 4/2019 | Lim .................... H04W 52/146 |
| 2019/0306923 | A1* | 10/2019 | Xiong ................. H04J 13/0062 |
| 2019/0364588 | A1* | 11/2019 | Lu ......................... H04L 1/1887 |
| 2019/0387377 | A1* | 12/2019 | Zhang ................ H04W 52/383 |
| 2020/0022089 | A1* | 1/2020 | Guo ..................... H04L 1/1812 |
| 2020/0100230 | A1* | 3/2020 | Lee ........................... H04L 5/06 |
| 2020/0267671 | A1* | 8/2020 | Chae ...................... H04L 5/001 |
| 2020/0322923 | A1 | 10/2020 | Yasukawa et al. |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Intel Corporation, "Sidelink measurements for V2V sensing and resource re-selection procedures," 3GPP TSG RAN WG1 Meeting #86, R1-166511, Gothenburg, Sweden (Aug. 22-26, 2016).

InterDigital Inc., "Mode 2a and Mode 2d for NR V2X Resource Allocation," 3GPP RAN WG1 Meeting AH 1901, R1-1900769, Taipei, Taiwan (Jan. 21-25, 2019).

InterDigital Inc., "NR Sidelink Resource Allocation Mechanism for Mode 2," 3GPP TSG RAN WG1 #96bis, R1-1905402, Xi'an, China (Apr. 8-12, 2019).

InterDigital Inc., "NR Sidelink Resource Allocation Mechanism for Mode 2," 3GPP TSG RAN WG1 #97, R1-1907094, Reno, USA (May 13-17, 2019).

InterDigital Inc., "Qos Management for NR V2X," 3GPP RAN WG1 Meeting #94, R1-1808600, Gothenburg, Sweden (Aug. 20-24, 2018).

InterDigital Inc., "Qos Management for NR V2X," 3GPP RAN WG2 Meeting #103bis, R2-1814018, Chengdu, China (Oct. 8-12, 2018).

InterDigital Inc., "Resource Allocation Features to Support NR V2X Requirements," 3GPP RAN WG2 Meeting #103bis, R2-1814016, Chengdu, China (Oct. 8-12, 2018).

InterDigital Inc., "Resource Allocation for NR V2X," 3GPP RAN WG1 Meeting #95, R1-1813164, Spokane, USA (Nov. 12-16, 2018).

InterDigital Inc., "Resource Allocation for NR V2X," 3GPP RAN WG1 Meeting #94b, R1-1811115, Chengdu, China (Oct. 8-12, 2018).

Third Generation Partnership Project, "Technical Specification Group Services and System Aspects; Enhancement of 3GPP support for V2X scenarios; Stage 1 (Release 15)," 3GPP TS 22.186 V15.3.0 (Jun. 2018).

Third Generation Partnership Project, "Technical Specification Group Services and System Aspects; Enhancement of 3GPP support for V2X scenarios; Stage 1 (Release 16)," 3GPP TS 22.186 V16.2.0 (Jun. 2019).

Third Generation Partnership Project, "Technical Specification Group Radio Access Network; Study on LTE-based V2X Services; (Release 14)," 3GPP TR 36.885 V14.0.0 (Jun. 2016).

Third Generation Partnership Project, "Technical Specification Group Services and System Aspects; Service requirements for V2X services; Stage 1 (Release 14)," 3GPP TS 22.185 V14.4.0 (Jun. 2018).

Third Generation Partnership Project, "Technical Specification Group Services and System Aspects; Service requirements for V2X services; Stage 1 (Release 15)," 3GPP TS 22.185 V15.0.0 (Jun. 2018).

Third Generation Partnership Project, "Technical Specification Group Radio Access Network; Study on evaluation methodology of new Vehicle-to-Everything V2X use cases for LTE and NR; (Release 15)," 3GPP TR 37.885 V1.0.0 (May 2018).

Third Generation Partnership Project, "Technical Specification Group Radio Access Network; Study on evaluation methodology of new Vehicle-to-Everything V2X use cases for LTE and NR; (Release 15)," 3GPP TR 37.885 V15.0.0 (Jun. 2018).

Third Generation Partnership Project, "Technical Specification Group Radio Access Network; Study on evaluation methodology of new Vehicle-to-Everything (V2X) use cases for LTE and NR; (Release 15)," 3GPP TR 37.885 V15.3.0 (Jun. 2019).

Third Generation Partnership Project, "Technical Specification Group Radio Access Network; NR; Physical layer procedures for data (Release 15)," 3GPP TS 38.214 V15.2.0 (Jun. 2018).

Third Generation Partnership Project, "Technical Specification Group Radio Access Network; NR; Physical layer procedures for data (Release 15)," 3GPP TS 38.214 V15.6.0 (Jun. 2019).

Third Generation Partnership Project, "Technical Specification Group Radio Access Network; NR; Medium Access Control (MAC) protocol specification (Release 15)," 3GPP TS 38.321 V15.2.0 (Jun. 2018).

Third Generation Partnership Project, "Technical Specification Group Radio Access Network; NR; Medium Access Control (MAC) protocol specification (Release 15)," 3GPP TS 38.321 V15.6.0 (Jun. 2019).

* cited by examiner

NR V2X—METHODS FOR DATA TRANSMISSION IN WIRELESS SYSTEMS

CROSS REFERENCE TO RELATED APPLICATIONS

This application is the U.S. National Stage, under 35 U.S.C. § 371, of International Application No. PCT/US2019/045265 filed Aug. 6, 2019, which claims the benefit of U.S. Provisional Application No. 62/715,659 filed on Aug. 7, 2018, U.S. Provisional Application No. 62/736,287 filed on Sep. 25, 2018, U.S. Provisional Application No. 62/752,787 filed on Oct. 30, 2018, U.S. Provisional Application No. 62/789,861 filed on Jan. 8, 2019 and U.S. Provisional Application No. 62/840,793 filed on Apr. 30, 2019, the contents of each of which are hereby incorporated by reference herein.

SUMMARY

A method and wireless transmit/receive unit (WTRU for selecting a resource for transmission. The method may comprise determining a priority of a data packet and determining a channel busy ratio (CBR) of a resource pool. The WTRU may set a backoff counter to an initial backoff value, in accordance with at least one of the priority of the packet or the CBR. A clear channel assessment (CCA) may be performed in a plurality of resource slots to determine whether the resource slots are available. The backoff counter may be decreased by the number of available resources in each slot. When the backoff counter reaches a threshold value, which may be set at 0, the resource for transmission may be randomly selected. The WTRU may then transmit data to another WTRU on the randomly selected resource.

BRIEF DESCRIPTION OF THE DRAWINGS

Furthermore, like reference numerals in the figures indicate like elements, and wherein.

EXAMPLE NETWORKS FOR IMPLEMENTATION OF THE EMBODIMENTS

Figure 1A:
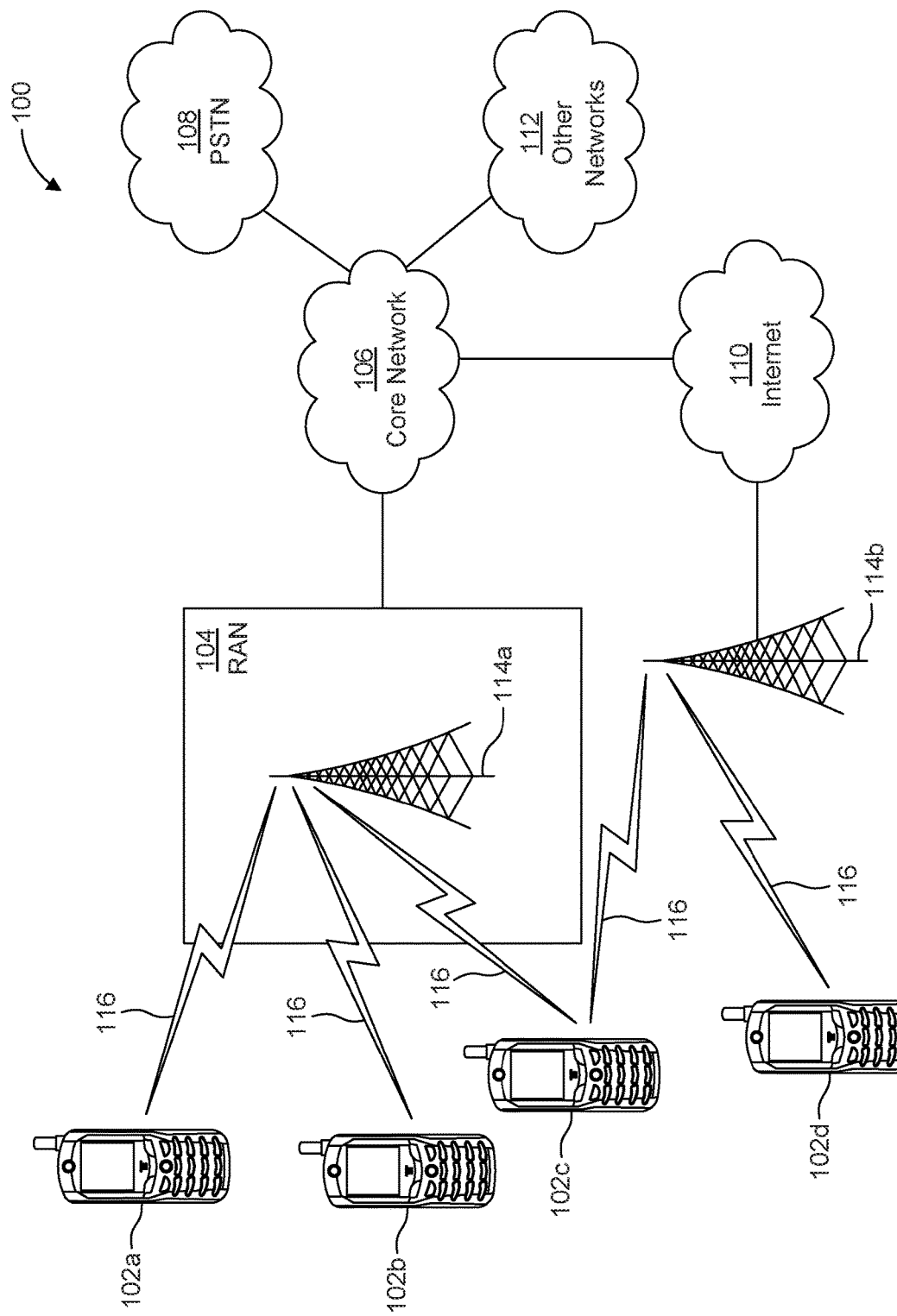
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (for example, remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
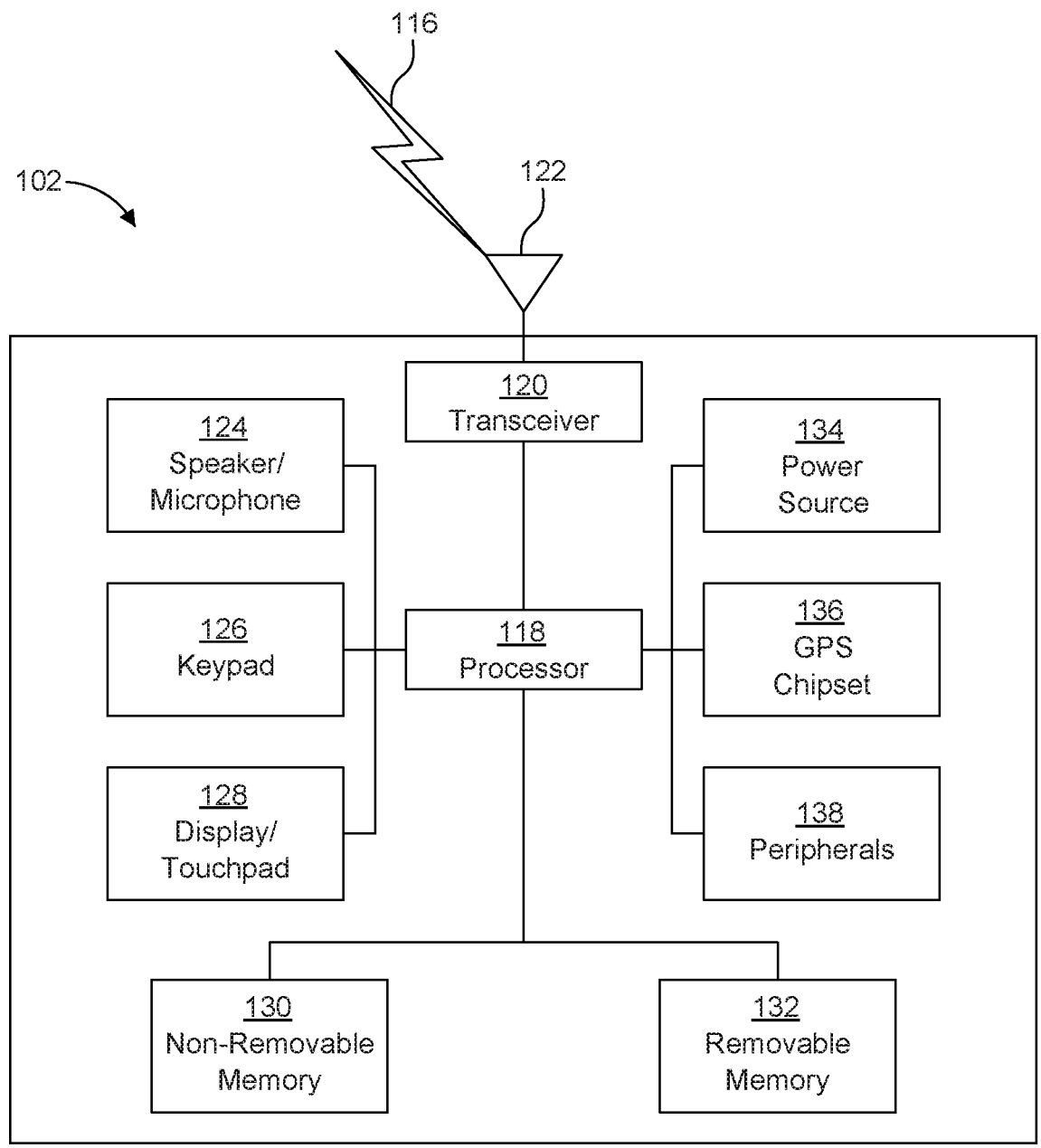
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB)

port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
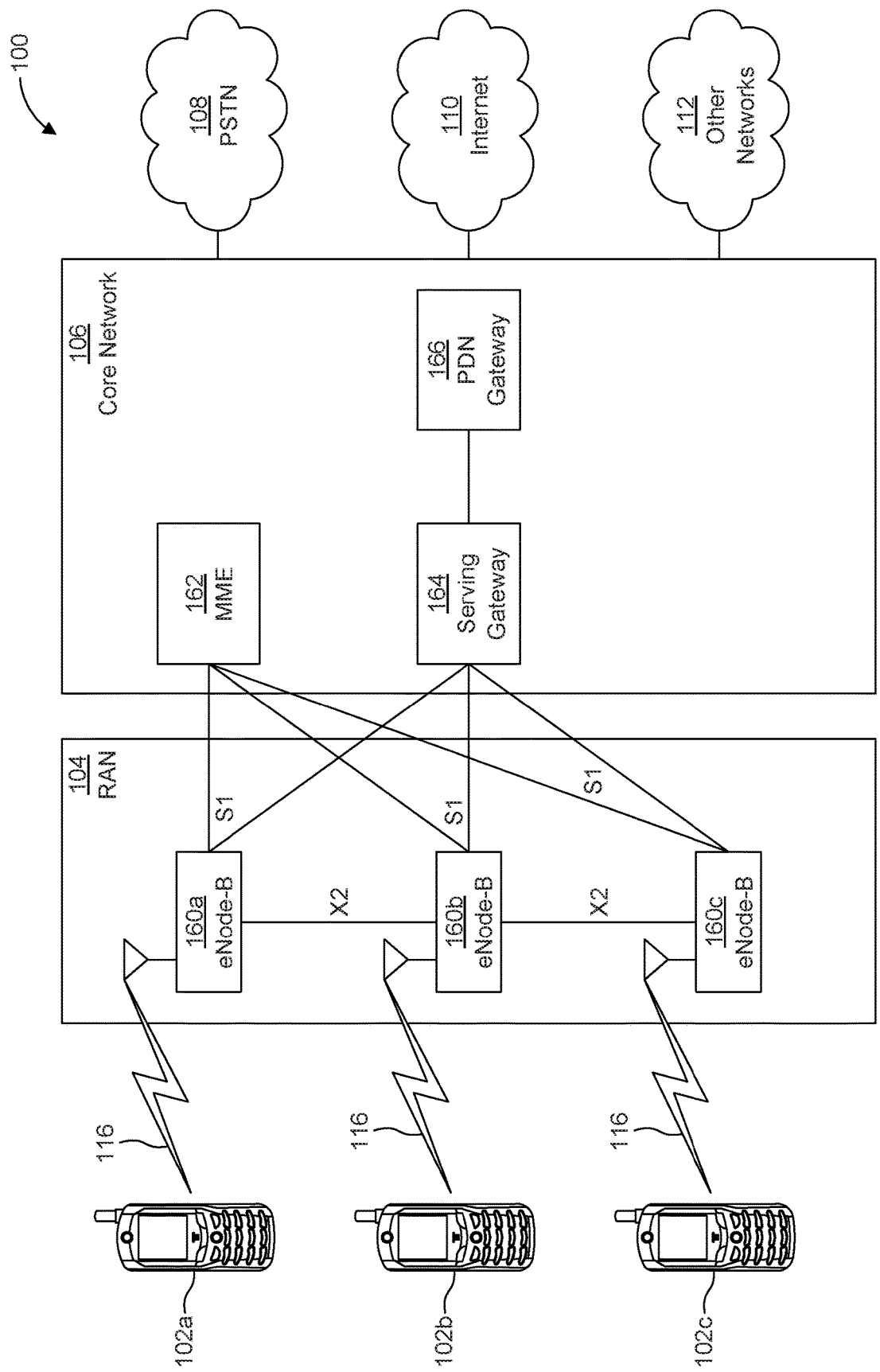
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
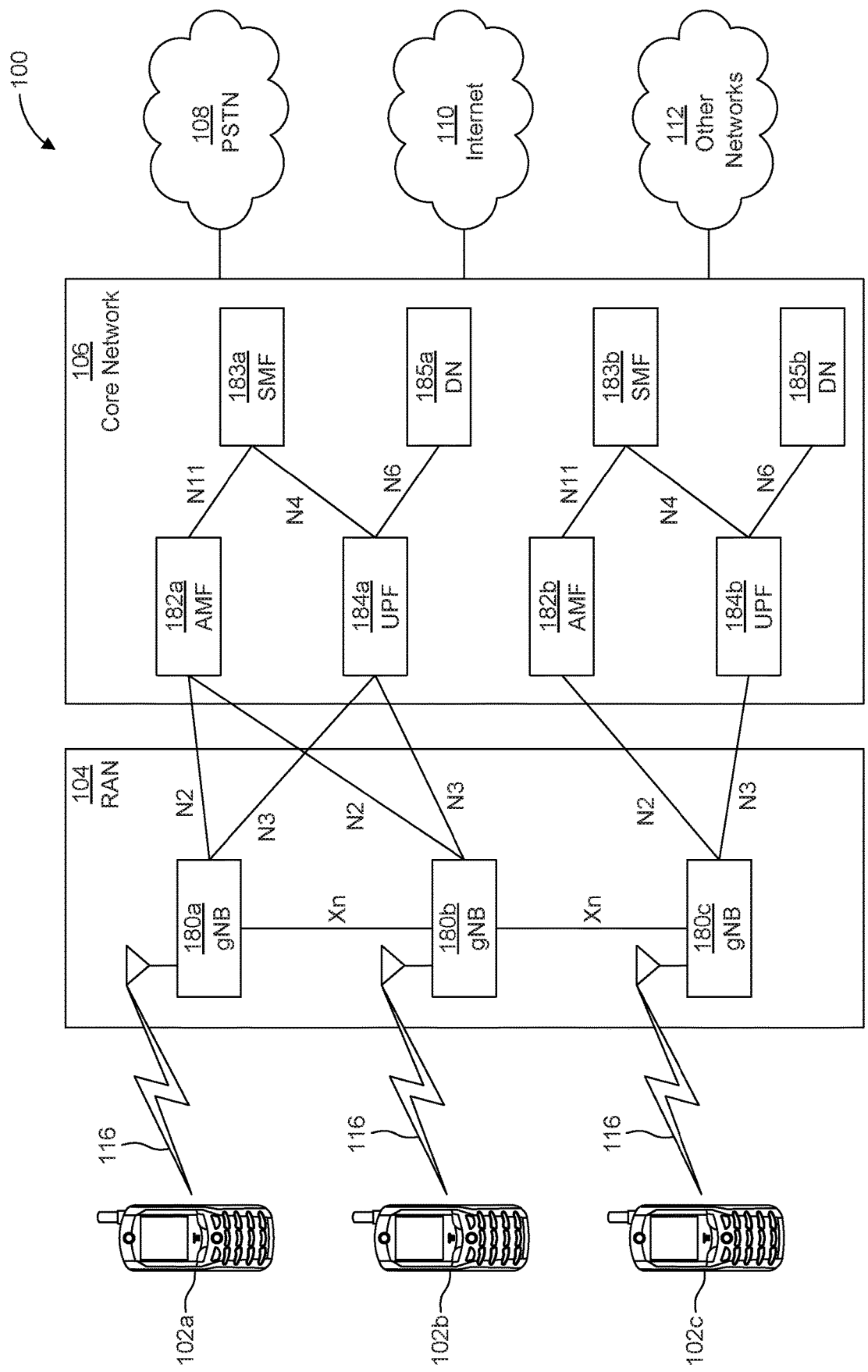
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

The V2X feature of LTE provides support for basic safety services. In general, there are two traffic types supported, periodic traffic and event-trigger traffic. According to one traffic model, periodic and aperiodic traffic is generated as follows. For periodic traffic, one 300-byte message is followed by four 190-byte messages. Moreover, the inter-arrival time between two packets is multiple of 100 ms. For event-triggered traffic, when an event is triggered, which follows the Poisson process, 6 messages are generated with a periodicity of 100 ms. From the above traffic model for LTE V2X, in general, both event-triggered and periodic traffic may be considered as periodic traffic.

Sensing and resource selection of LTE V2X may be performed by a WTRU prior to transmission of control information or data. In LTE V2X, the physical sidelink control channel (PSCCH) and physical sidelink shared channel (PSSCH) are transmitted in the same subframe. PSCCH contains the sidelink control information (SCI), which provides information about an upcoming or simultaneous PSSCH transmission. By decoding PSCCH, a receiving WTRU may decode the following information: frequency and time of the forward booking PSSCH; priority of the PSSCH; frequency and time of a PSSCH retransmission.

In general, a vehicle type WTRU in LTE V2X performs sensing and resource selection as follows. At first, it performs sensing to decode one or more SCIs sent from one or more other WTRUs. From decoding the SCI(s), the WTRU may have information of the forward booking PSSCH and the corresponding priority. The WTRU may consider the forward booking PSSCH as occupied and exclude it from resource selection if its Reference Signal Received Power (RSRP) of the PSCCH (RSRP_PSSCH) is greater than a threshold. The WTRU then ranks the remaining resources in the ascending order of received signal strength indicator (RSSI) and may select 20% of the total resource denoted as set SA for final resource selection. Finally, it randomly selects one resource in SA for transmission.

Similar to LTE V2X, NR V2X targets to support two traffic types, namely periodic and aperiodic. However, NR targets to support more many different types of packet sizes, packet arrival rates, and latency requirements. Specifically, model 2 aperiodic traffic supports the following properties: a packet size range between 10000 and 30000 bytes; an average inter-arrival rate of 20 ms; latency requirement of 10 ms. In addition, mode 3 periodic traffic has the following properties: a packet size range between 30000 and 60000 bytes; an average inter-arrival rate of 30 ms; and a latency requirement of 30 ms.

For NR V2X, aperiodic traffic is considered as an important traffic model required in the most advanced scenarios. For traffic model 2, a WTRU may need to perform resource selection very frequently, for example, every 20 ms on average. If a WTRU follows the same resource selection procedure of LTE V2X, resource collision will happen very frequently because the probability that multiple WTRUs perform resource selection simultaneously will increase.

In one embodiment, a WTRU may perform resource selection for bursty traffic without increasing the risk of resource collisions.

Resource selection in LTE V2X allocates resources for a single transport block. For model 2 aperiodic traffic and model 3 periodic traffic, NR V2X targets to support very large packet size, for example, up to 60000 bytes for periodic traffic, and up to 30000 bytes for aperiodic traffic. Therefore, performing resource selection for one application layer packet may require segmentation of the packet and performing the resource selection multiple times for each transport block associated with the packet. An alternative embodiment is to perform resource selection for multiple TBs simultaneously, for example, using a single resource selection procedure.

Figure 2:
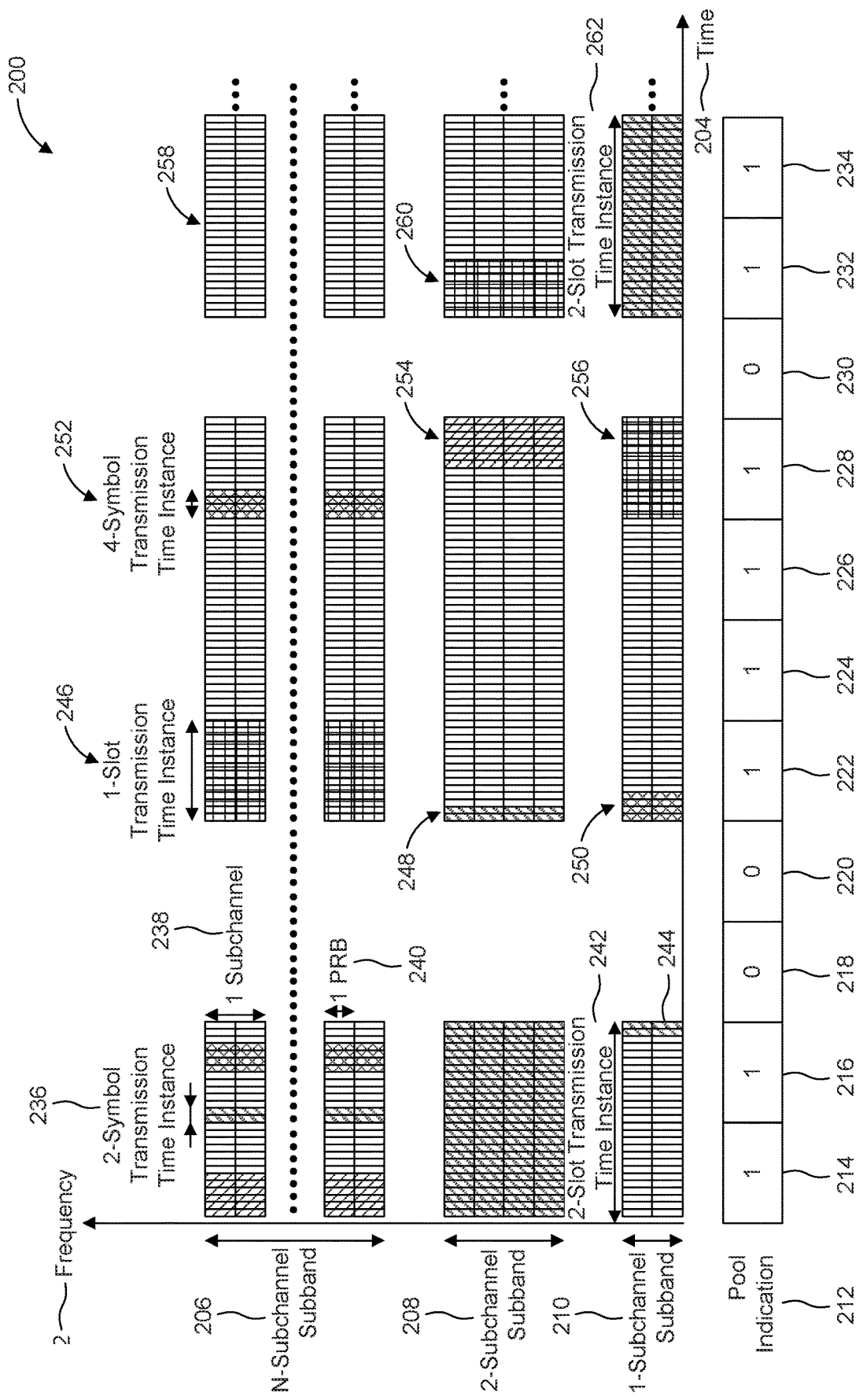
FIG. 2 is a diagram which illustrates a channelization of time and frequency resources.

FIG. 2 is a diagram 200 which illustrates channelization of time 204 and frequency 202 resources. In an embodiment, a WTRU may perform resource selection for multiple TB transmissions. A WTRU may be configured in accordance with alternative options for channelization. One or more resource pools may be channelized as is illustrated. In the frequency domain 202, 1 subchannel may consist or may be comprised of $N_{sub}$ contiguous PRBs, for example, there may be 2 PRBs per subchannel. Each subchannel may be orthogonal in the frequency domain. 1 subband may consist of or may be comprised of N subchannels. Each subband may be overlapped or non-overlapped in frequency and each subband may or may not have the same number of subchannels. One transmission may occupy one subband in the frequency domain.

In the time domain 204, a transmission time instant may be determined based on two factors: the duration of a transmission and whether a transmission is a slot-based or non-slot based transmission. For a slot-based transmission, one transmission may span over N slots. For a non-slot based transmission, one transmission may span over N≤14 symbol(s). An initial transmission may be at the beginning of the slot, at the second half of a slot, or at any symbol of a slot.

In the example shown in FIG. 2, there are three different example subband configurations 206-210 illustrated. In the N-subchannel subband 206 illustration, each subchannel is comprised of 2 PRBs. Each one of four PRBs correspond to one of two channels which are separated in frequency. A variable number of additional subchannels are not shown for simplicity. In the 2-subchannel subband 208 example, there are 4 PRBs. In the 1-subchannel subband 210 example, there are two PRBs illustrated.

A pool indication 212 may be provided as a bitmap which denotes pools as being 'on' via a (1) bit or 'off' denoted by a (0) bit. The pool indication may be made via RRC, MAC or PHY signaling.

In the example shown, the first two bits 214, 216 are 'on' and thus in the time domain there are transmission time instances available for transmission. The WTRU may, according to the bitmap, determine whether transmission time instants are available on one or more subbands 206-210. For example, the WTRU may determine that a two-symbol transmission time instance 236 is available on N channel subband 206 along a whole subchannel 238 or along only a single or both PRBs, for example, PRB 240. The WTRU may determine that a two slot transmission time instance 242 is available on the 2 subchannel subband 208. The WTRU may determine that only 2 symbols 244 of the 1 subchannel subband 210 are available. The WTRU may enter a doze state during the next two slots based on determining that bits 218, 220 are set to 'off.'

The WTRU may wake up upon determining that the next four bits 222-228 are set to 'on.' For example, the WTRU may determine that a full slot 246 is available on the N subchannel subband 206. Two symbols 248 of 2 subchannel subband 208 may be available. Four symbols of 1 subchannel subband 210 may be available. In time periods corresponding to pool bits 222, 224, no transmission may be available. In the time interval corresponding to pool bit 228, a 4 symbol transmission time instant 252 may be available on N subchannel subband 206. A 7 symbol transmission time instance 254 may be available on 2 subchannel subband 208. A full slot 256 may be available on the 1 subchannel subband 210. During the time period corresponding to bit 230, the WTRU may sleep.

During the time periods corresponding to pool bits 232, 234, the WTRU may have no availability 258 in the N subchannel subband. The WTRU may have an 8 symbol transmission time instance 260 in 2 subchannel subband 208. The WTRU may have a 2-slot transmission time instance 262 in the 1 subchannel subband 210. Any number of symbols or slots may be configured as a transmission time instant.

Resource selection may be performed for one or more TB transmission of periodic and aperiodic packets. In one embodiment, one resource group may be defined as one group of N subchannels spanning over M symbol(s). One resource group format (RGF) may be defined as one tuple (M, N). In an embodiment, a high-level procedure for WTRU to perform resource selection may include the following. 1. A WTRU determines an RGF for resource selection within resource selection window. The selection window may be determined to satisfy the latency requirements of the TB. 2. A WTRU may exclude the set of unavailable resources, which might be occupied by another WTRU or group of WTRUs, and may cause non-negligible interference to a transmission if the WTRU use these resources. 3. A WTRU may perform resource selection within the selection window.

A WTRU may determine a minimum value of M to support sensing. In one embodiment, the WTRU may be (pre-)configured with a range of M, for example, a minimum transmission and a maximum transmission duration to support a CCA procedure and reduce the half-duplex problem. Specifically, the WTRU may be configured for the range of M based on one or more of the following: the QoS of the MAC PDU, for example vehicle quality indicator (VQI), priority, latency, reliability, etc.; the congestion level of the resource pool, for example, a CBR; the size of the MAC PDU; a packet size and/or buffer size and/or a traffic pattern.

A clear channel assessment (CCA) procedure may involve a consideration of a number of options. A WTRU may be configured with the following parameters to perform CCA: a bandwidth of one assessed channel; a number of the assessed channels; a duration to assess the channel; a starting time instant of the assessment; an ending time instant of the assessment; an energy/power threshold (RSRP, received signal code power (RSCP), SINR OR SNR) to determine the availability of an assessed channel; and/or a duration of a reservation signal. For example, the WTRU may transmit a reservation signal when it finishes a CCA procedure and determines the channel as idle.

Figure 3:
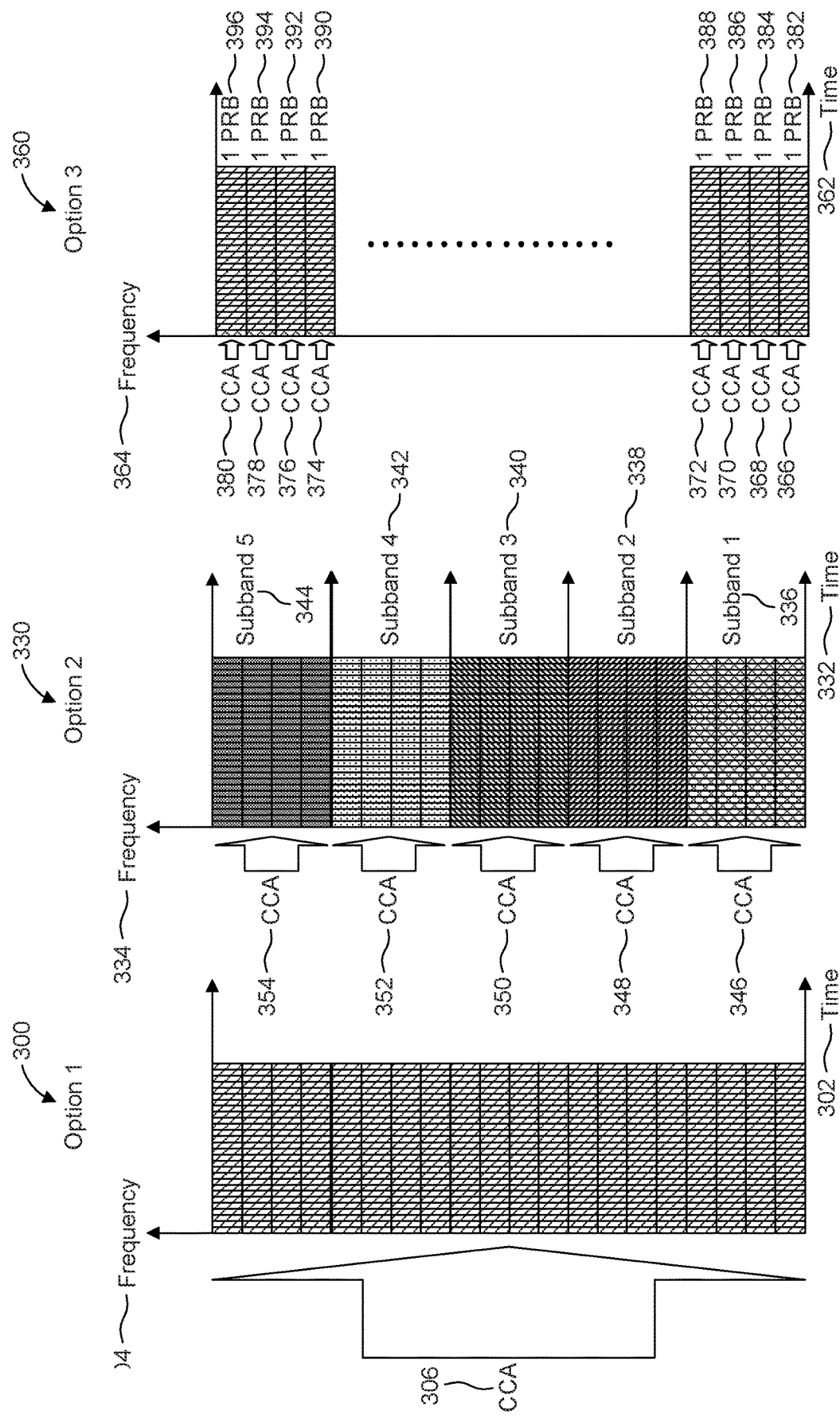
FIG. 3 is a diagram which illustrates example options of a clear channel assessment (CCA) configuration.

FIG. 3 is a diagram which illustrates three options 300, 330, 370 of a clear channel assessment (CCA) configuration. The options for bandwidth and number of assessed channels for CCA are described in FIG. 3, where the WTRU performs CCA in a bandwidth of 100 MHz.

In option 1 300, the x-axis represents time 302 and y-axis represents frequency 304. In an example, the WTRU may perform CCA 306 on all bandwidth at once. In option 2, the x-axis again represents time 332 and y-axis represents frequency 334. In this example, the WTRU may split the bandwidth into 5 channels or subbands 336-344, 20 MHz each, and may perform CCA 346-354 in each channel to determine the availability of each channel. In option 3 360, the x-axis represents time 362 and y-axis represents frequency 364. In this example, the WTRU may perform CCA 366-380 in each PRB 382-396 and may determine the availability of each PRB 382-396 independently.

In one embodiment, a WTRU may be configured to operate, for example, transmit or receive, in accordance with a wide-band energy measurement, for example, an RSSI. A WTRU may perform such a measurement based on automatic gain control (AGC) output without baseband processing.

In another embodiment, a WTRU may perform an RSRP, RSCP, SINR or SNR measurement. The WTRU may perform FFT and sub-carrier de-mapping to obtain an energy measurement result at a more refined granularity, for example, per resource block group (RBG), physical resource block (PRB) or sub-carrier.

A WTRU may determine the availability of one RGF based on the result of a CCA procedure. In one embodiment, the WTRU may determine that the RGF is unavailable if the CCA procedure indicates that at least one channel, which overlaps with the RGF, is unavailable. In another embodiment, the WTRU may determine that the RGF is unavailable if at least X % of the PRBs in the RGF is indicated as unavailable during the CCA procedure. X may be preconfigured or may be provided in WTRU specific or group specific signaling.

In one set of embodiments, the WTRU may determine the parameters for CCA based on the size and/or QoS of the MAC PDU. Specifically, the CCA parameters may be dynamically change based on the size, latency and/or QoS of the MAC PDU.

In one embodiment, the WTRU may determine the bandwidth of one assessed channel based on the resource size of a MAC PDU. This embodiment may aid the WTRU to have more exact information corresponding to the resource it wants to transmit. For example, if one MAC PDU requires 10 PRBs for transmission, the WTRU may determine that the bandwidth of the assessed channel is 10 or 20 PRBs.

In another embodiment, the WTRU may determine energy or power thresholds, for example, RSRP, RSCP, SINR or SNR, to evaluate the availability of an assessed channel based on the QoS characteristics of the MAC PDU, for example, VQI, priority, latency, or the like. This embodiment may prioritize the packet with different priorities, reliabilities or latency requirements. For example, the WTRU may be configured with a difference of x decibels (xdB) between packets with successive priorities.

In another embodiment, the WTRU may determine a channel access instant based on a priority or latency of a MAC PDU. In one embodiment, the WTRU may be configured for higher channel access instant density, which indicates the number of channel access instants for a period, for high priority or latency requirement data. In another embodiment, the WTRU may be configured with a different channel access time for different MAC PDUs with different priority or latency requirements. For example, the WTRU may be configured with a channel access symbol/slot in a slot or subframe for high priority or latency requirement data, sooner than another. This embodiment may be utilized such that high priority data may receive access to the channel sooner than low priority data. Therefore, the low priority channel, when performing CCA, may avoid the high priority data.

In another embodiment, the WTRU may determine the duration of a reservation signal based on a priority or latency of the MAC PDU. The WTRU may determine the reservation duration for a MAC PDU based on its QoS. For example, the WTRU may determine that the duration of the reservation for a low priority MAC PDU may be shorter than the duration of the reservation signal for a high priority MAC PDU. This embodiment may restrict the low priority MAC PDU in reserving a channel for a long time. Thus, timers or other methods may be employed to ensure that low priority PDUs are capable of being transmitted.

A resource selection may be based on a combination of CCA, SCI decoding, and random selection. A WTRU may combine CCA and SCI decoding and random resource selection to determine a resource for transmission. In one set of embodiments, a WTRU may perform resource selection by a combination of one of the following procedures. Procedure 1: A WTRU, by decoding other WTRU's SCI, may exclude the resources reserved by other WTRU if its measured power/energy in PSSCH or PSCCH is greater than a threshold. Procedure 2: A WTRU may select a subband, resource, channel, RGF, transmission time instant or the like for possible transmission and/or evaluation of CCA. Procedure 3: A WTRU may perform a clear channel assessment (CCA) before transmission of one TB.

A WTRU may perform Procedure 2, which determines a subband, resource, RGF, transmission time instant for a possible transmission and/or CCA. In one approach, a WTRU may be configured to select a subband which has one or any combination of the following properties for a possible transmission and/or CCA. The WTRU may select the subband which has the highest number of available resources for a possible transmission within the resource selection window. The WTRU may select the subband which has the longest consecutive available resources within the resource selection window. The WTRU may select the subband which has the earliest available resource within the resource selection window. The WTRU may select the subband which has N consecutive available resources within the resource selection window. The WTRU may be configured to randomly select one out of multiple subbands which satisfies the above the constraint. Alternatively or in combination, the WTRU may be configured to select the subband which has the earliest N consecutive available resources within the resource selection window. The value of N may be (pre-)configured based on one or any combinations of the following: the QoS of the TB, including the priority and/or latency of the TB; or the size of the TB.

In an approach, the WTRU may be configured to select a transmission time instance for a possible transmission and/or CCA based on one or both of the following: the earliest transmission time instant within the resource selection window which has at least one available resource or subband; or the transmission time instant which has at least N available resources/subbands. The WTRU may be configured to randomly select one transmission time instant which satisfies the above constraint or alternatively, the WTRU may be configured to select the earliest transmission time instant satisfying the above constraint. The value of N may be (pre-)configured based on one or any combination of the following: the QoS of the TB, including a priority and/or latency of the TB; or the size of the TB.

In one embodiment, a WTRU may be configured to perform a measurement with a wide-band energy measurement method, for example, RSSI. A WTRU may perform such a measurement based on automatic gain control (AGC) output without baseband processing.

In another embodiment, a WTRU may perform an RSRP, RSCP, SINR OR SNR measurement. The WTRU may perform FFT and sub-carrier de-mapping to obtain an energy measurement result at a more refined granularity for example per RBG, PRB or sub-carrier.

A combination of the above procedures may avoid the resource collision in different scenarios. Procedure 1 may avoid the resources forward booked by other WTRUs for a periodic traffic. Procedure 2 may randomize the resource collision among the WTRUs performing dynamic resource selection for one TB transmission. Procedure 3 may mitigate a resource collision with the WTRU performing continuous transmissions of multiple TBs.

The WTRU may perform Procedure 1 before a CCA procedure to further excluding the reserved resources by decoding the SCIs between two CCA instants. A WTRU may decode any resource reservation signal/message, for example, an SCI_Notification message, a pre-emption message, a resource reservation sequence, etc., to future exclude the reserved resources.

In one embodiment, a WTRU may combine three procedures to perform resource selection as follows. Initially, a WTRU may perform Procedure 1. Similar to LTE V2X, the WTRU may exclude the resource which has measured power/energy greater than a threshold and indicated as occupied by other WTRU in one SCI. The WTRU may select M % of the total resources in the resource selection window as a set of available resources for selection according to a certain criterion such as received power, RSSI, etc.

After finishing Procedure 1, the WTRU may follow the following approach. In the first approach, the WTRU may perform Procedure 2 by selecting one subband, one or more resources, one or more RGFs or one or more transmission time instants for possible transmission in the set of available resources in Procedure 1. After Procedure 2, the WTRU may perform Procedure 3, which determines whether the selected subband, resources, RGFs, transmission time instants is or are available or not. If the subband, resources, RGFs, transmission time instants is or are idle, the WTRU may transmit the packet in the selected subband, resources, RGFs or transmission time instants. Otherwise, if the channel is busy, the WTRU may wait until the channel becomes available and transmit the packet in that channel or the WTRU may randomly select the other subband, resources, RGFs or transmission time instants for possible transmission and perform CCA. The procedure may continue until the WTRU may select one resource/channel/RGF/transmission time instance for transmission or it may terminate when the WTRU could not find any resource for transmission within the selection window.

In the second approach, the WTRU may perform Procedure 2 by selecting X subbands/resources/RGFs/transmission time instances for possible transmission in the set of available resources in Procedure 1. Afterward, the WTRU may sequentially perform Procedure 3, which determines whether one selected subband, resources, RGFs or transmission time instants is available or not, for each of X subband, resources, RGFs or transmission time instants until it can select one subband, resources, RGFs or transmission time instants for transmission or it could not find a subband, resources, RGFs or transmission time instants for transmission within the selection window.

In the third approach, the WTRU may perform Procedure 2 by selecting one transmission time instance for possible transmission in the set of available transmission time instants in Procedure 1. One transmission time instant may be considered as available if it contains at least X available resources after Procedure 1, where X may be a fixed value. After Procedure 2, the WTRU may perform CCA to determine whether any resource for transmission is available or not. If one or more resource is available, the WTRU may randomly select one resource for transmission. Otherwise, if all subbands are busy, the WTRU may select the next available transmission time instant or may randomly select another available transmission time instant to perform CCA. The procedure may continue until the WTRU can select one resource for transmission or it may terminate when the WTRU could not find a resource for transmission within the selection window.

In a fourth approach, a WTRU may perform Procedure 3 immediately following Procedure 1 to further determine the resources available in a predefined window. From the resources deemed available, a WTRU may then perform Procedure 2 to transmit on one or more of the randomly selected available resources.

Resource selection may be based on a combination of CCA, SCI decoding, backoff, and random selection. A WTRU may integrate CCA, SCI decoding, random resource selection, and backoff to select a resource for transmission. In another set of embodiments, a WTRU may perform resource selection by combination of one of the following procedures. Procedure 1: A WTRU, by decoding another WTRU's SCI, may exclude the resources reserved by other WTRU if its measured power/energy in PSSCH or PSCCH is greater than a threshold. Procedure 2: A WTRU may select a subband, resource, RGF or transmission time instant for possible transmission and/or evaluation of CCA. Procedure 2 may be performed similarly by selecting a resource based on a combination of CCA, SCI decoding, and random selection. Procedure 3: A WTRU may perform a clear channel assessment (CCA) before transmission of one TB. Procedure 4: A WTRU may perform a backoff procedure by initially selecting a random backoff value in the range [0, B] then decreasing the backoff value following a certain criterion. The backoff procedure may be used to randomize the resource collision and prioritize channel access of packets having different priorities.

In any embodiment described herein, the WTRU may perform Procedure 1 before a CCA procedure to further excluding the reserved resources by decoding the SCIs between two CCA instant. The WTRU may decode any resource reservation signal/message, e.g., SCI_Notification message, pre-emption message, resource reservation sequence, etc., to future exclude the reserved resources. In the backoff procedure, the amount of the backoff decrease and/or the range of the initial backoff value may depend on one or any combination of the following: QoS of the MAC PDU, for example, the backoff value will decrease more if the MAC PDU has higher priority, in one embodiment, the WTRU may be configured with different decrease values based on priority, latency and/or reliability of the MAC PDU; the number of failed CCAs; the time to the end of the resource selection window; a number of available channels/RGFs; a radio activity of the resource pool, carrier or bandwidth part (BWP), for example, CBR; the order of transmission for one TB, for example, whether the TB consists of or is comprised of a transmission or a retransmission. For example, the maximum value of backoff value for the initial transmission may be smaller or greater than the maximum value of the retransmission.

In one embodiment, a WTRU may combine four procedures to perform resource selection as follows: initially, a WTRU may perform Procedure 1 to the resource within the selection windows; then, the WTRU may randomly select a backoff value in the range [0, B], where the value of B may depend on one or combination of the following: a usage of the resource pool such as CBR measurement; or a QoS of the packet such as VQI, priority, reliability, range, etc., or a value derived from any of: a resource group format for transmission; a characteristic of the BWP such as bandwidth, subcarrier spacing, etc.

Afterward, the WTRU may:

In a first approach, the WTRU may perform Procedure 2 by selecting one subband to perform CCA. Then, the WTRU may perform Procedure 3, which evaluates whether the channel is available or not. If the channel is available, the WTRU may decrease the backoff value every time interval Ti. If the backoff value is smaller than or equal to zero, the WTRU may perform transmission of the TB. Otherwise, if the backoff value is greater than zero, the WTRU may wait for a period of time Tw and perform CCA again or the WTRU may keep the backoff value and change to another channel to perform CCA. The value of Ti and Tw may be determine based on one or any combination of the following: time division duplex (TDD) configuration of the resource pool/BWP; QoS of the MAC PDU; the number of failed CCAs; time to the end of the resource selection window; number of available channels/RGFs; and/or radio activity of the resource pool/carrier/BWP.

In a second approach, the WTRU may randomly select X subbands to perform parallel CCA in each channel. The WTRU may perform CCA independently in each one of the subbands, in which the CCA procedure in each subband may be similar to the previous approach. The WTRU may perform transmission in one subband when the backoff value associated with the subband is smaller than or equal to zero.

In a third approach, the WTRU may perform one CCA in multiple subbands. Specifically, in each transmission time instant, the WTRU may determine the number of available resources, channels, or RGF by performing CCA in the selected subbands. Then, the WTRU may decrease the backoff value. When the backoff value is smaller than or equal to zero, the WTRU may randomly select one resource for transmission.

Figure 4:
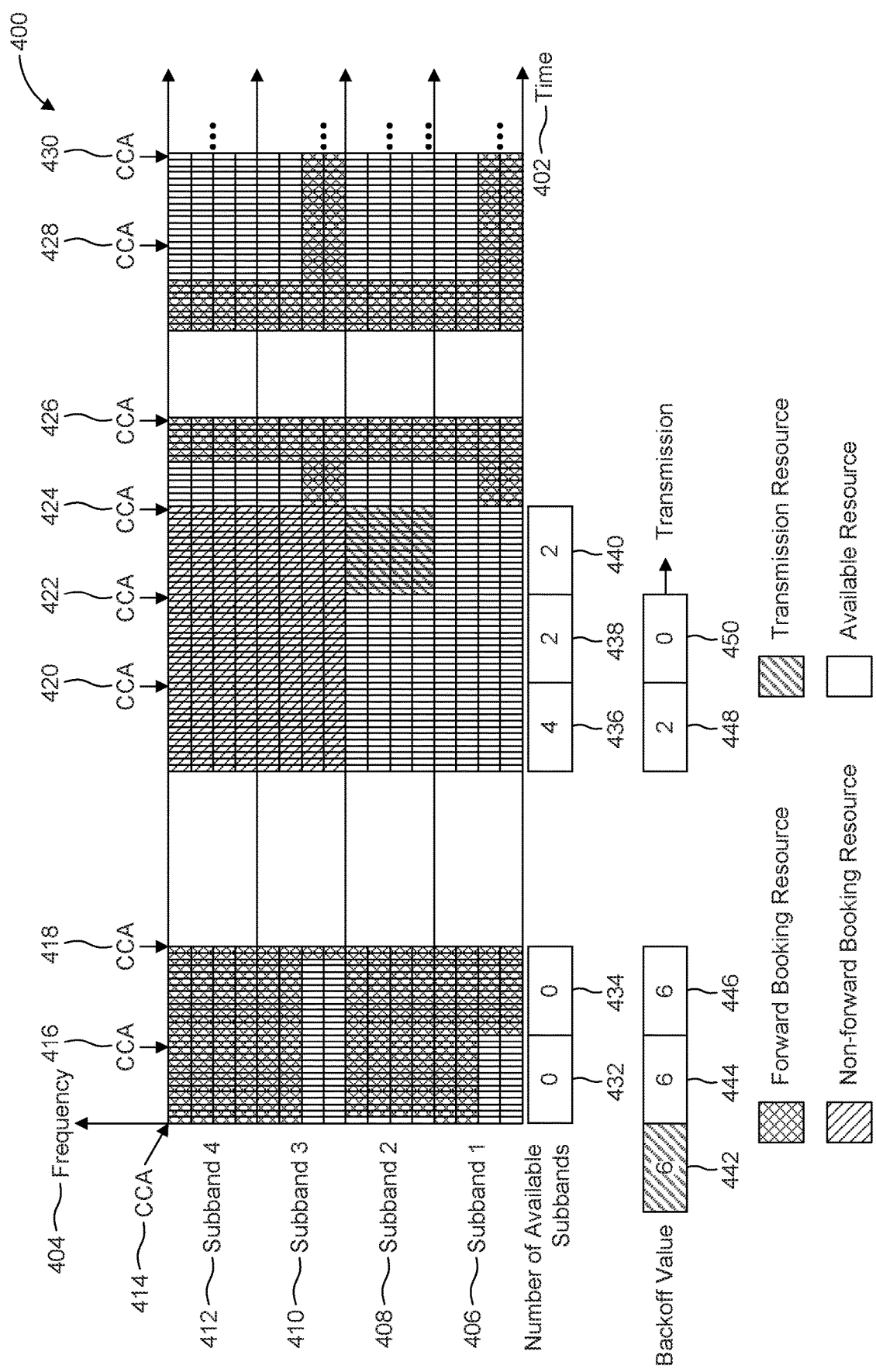
FIG. 4 is an example of a resource selection procedure.

FIG. 4 is a timing diagram 400 which shows an example in which a WTRU performs resource selection using the third approach 370 of FIG. 3. In this example, the x-axis represents time 402 and y-axis represents frequency 404. The WTRU performs resource selection in 4 subbands 406-412 in frequency 404. The WTRU may determine the RGF for one slot transmission within one subband. At first, the WTRU may exclude the resource(s) reserved by other WTRUs. Then, the WTRU may randomly select a backoff value in the range [0, B]. In each transmission time instant, the WTRU decreases the backoff value by an amount equal to the number of available subbands. When the backoff value reaches 0, the WTRU randomly selects one available subband for transmission.

In FIG. 4, a CCA may be performed at each slot. At CCA 414, no resources are determined available and a backoff value may be set to or remain at 6 442. The same is true at CCA 416, 418 and the backoff value remains the same 444, 446. In CCA 416, portions of subband 1 406 and subband 3 410 are available, but the portions available are less than the entire subband. Thus, the number of subbands available 432, 434 at CCA 416, 418 is 0. Subsequently, at CCA 420, 4 subbands are determined as available 436. This is because subbands 1 and 2 406, 408 have available resources determined by CCA and subbands 3 and 4 410, 412 have resources available as determined by SCI decoding. Subbands determined available via SCI decoding are referred to as non-forward booking resources. Having determined 4 436 available subbands 1-4 406-412, the WTRU may subtract 4 from 6 and thus the backoff value becomes 2 448. Subsequently, at CCA 422, subbands 1 and 2 406, 408 remain available. The number of available subbands 438 is 2 and the backoff value 450 becomes 2. Thus, the WTRU may transmit on subband 2 408 in a next slot. The WTRU may continue determining a number of subbands available 440 while transmitting. The WTRU may continue performing CCA 424-430 over time 402 if there is more data to transmit.

Resource selection may be based on a combination of CCA, backoff and/or pre-emption. A WTRU may perform or determine a resource allocation by combining CCA, backoff and/or pre-emption. In one embodiment, the WTRU may perform resource allocation by a combining CCA, backoff and/or pre-emption. Specifically, the WTRU may perform a resource allocation procedure or, the WTRU may perform pre-emption, which may pre-empt one or multiple transmission resource for transmission of the WTRU. Pre-emption may occur when one or any combination of the following conditions are satisfied: the number of CCA failures during the resource allocation procedure is greater than a threshold; the backoff value is higher than a threshold when the time to the end of resource selection window is smaller than a threshold. These thresholds, for example, number of CCA failures threshold, backoff threshold, time to the end of resource selection window threshold or the like may be determined by one or any combination of the following: QoS of the MAC PDU, for example, VQI, priority, latency, reliability, etc.; congestion level of the resource pool, for example, CBR; the size of the MAC PDU; the packet size and/or a buffer size and/or a traffic pattern.

A WTRU may perform one or more resource selections for transmissions and retransmissions. In one embodiment, the WTRU may determine the number of retransmissions based on the reliability or QoS of the MAC PDU, such as such as priority, reliability, and latency, and/or the radio activity of the resource pool, for example, CBR. The WTRU may perform resource selection for transmission and retransmission sequentially by using the methods described.

Resource selection may be based on a combination of CCA and time division multiplexing (TDM) between control and data transmissions. A WTRU may transmit one or more SCI_Notification messages before transmission of the PSSCH. In one embodiment, a WTRU may be configured to transmit one or multiple SCI_Notification messages before transmission of one or multiple PSSCHs to notify other WTRUs about the intention to transmit one or multiple PSSCH transmissions in the future. In one embodiment, for one PSSCH transmission, the WTRU may be configured to transmit one or more SCI_Notification message(s) and PSCCH, where the SCI_Notification message(s) may be used to notify other WTRUs about the priority and resource usage of PSSCH and PSCCH which may be used to decode the PSSCH. In another embodiment, the WTRU may be configured to transmit only SCI_Notification message(s) which may be used to notify other WTRUs about future resource usage of one or multiple PSSCH and help other WTRUs in decoding future PSSCH transmission(s). One SCI_Notification message may implicitly or explicitly contain one of following information elements regarding the PSSCH transmission: time and frequency of the PSSCH; time and frequency of the PSCCH, aggregation level of the PSCCH, QoS parameter(s) such as priority, latency and/or reliability of the PSSCH; frequency and time of PSSCH retransmission(s); MCS; transmit power; granularity of the PSSCH (e.g. slot-based or non-slot-based); time difference between the PSSCH and the time requirements of the data for transmission, for example, the amount of slack in time associated with the data being transmitted in the associated PSSCH.

In one example, the SCI_Notification message contains priority and time-frequency resource(s) of the referred PSSCH(s) and PSCCH. In this example, the WTRU may need to transmit both PSCCH and PSSCH in the transmission referred by the SCI_Notification. The PSCCH is used to transmit SCI conveying information necessary to decode the PSSCH.

In another example, the SCI_Notification message contains VQI parameters, time-frequency resource(s) of the referred PSSCH(s), MCS parameter(s), etc. Such information may be used to decode the referred PSSCH. In this example, the WTRU may or may not transmit another SCI to decode the PSSCH. The WTRU may transmit another SCI to reduce the half-duplex problem. Alternatively, the WTRU may not transmit another SCI to improve the spectrum efficiency since the information conveyed in SCI_Notification is enough to decode the PSSCH. Whether the WTRU transmits another SCI or not may further depend on the VQI of the transmission in the associated PSSCH.

The WTRU may be configured to transmit an SCI_Notification message in a dedicated resource pool. Alternatively, it may be transmitted in PSCCH resource pool.

Figure 5:
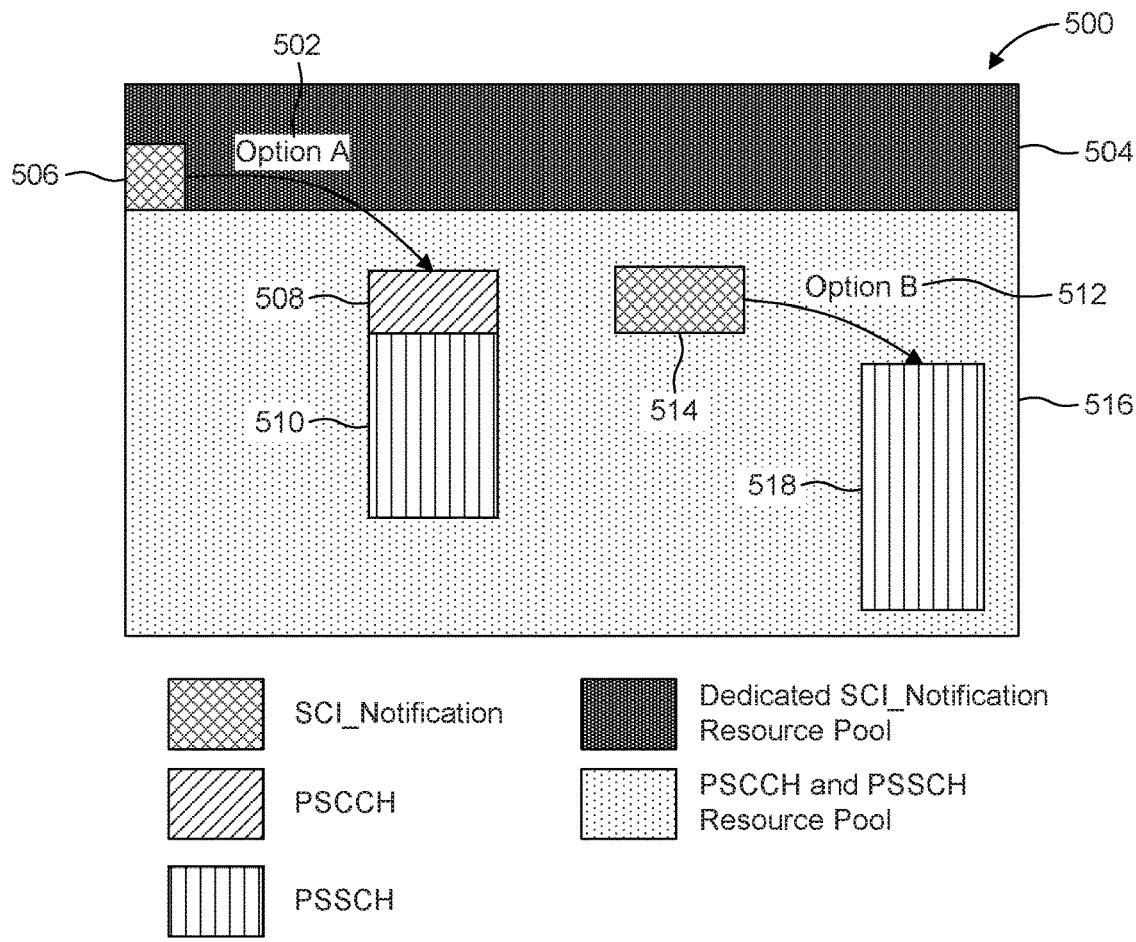
FIG. 5 is a diagram which illustrates a pool configuration of a sidelink control information (SCI) Notification (SCI_Notification)

FIG. 5 is a diagram which illustrates a pool configuration 500 of an SCI_Notification 506. In one example, the WTRU may be configured with a dedicated pool or a PSCCH resource pool 504 to transmit an SCI_Notification 506 used to notify other WTRUs about future PSCCH 508 and PSSCH 510 transmissions as illustrated in Option A 502 of FIG. 5. In another example, the WTRU may be configured to transmit an SCI_Notification 514 in the PSCCH resource pool 516 to help other WTRUs decoding a future PSSCH transmission 518 as illustrated in Option B 512 of FIG. 5.

A WTRU may be configured to transmit multiple SCIs, wherein all SCIs may be used to decode PSSCH and one or multiple SCIs may be used as SCI_Notification(s). In one embodiment, the WTRU may be configured to transmit multiple SCIs, wherein all the SCIs may be used to decode the PSSCH and one or multiple SCIs may be used as SCI_Notification(s). Specifically, the WTRU may be configured to transmit one or multiple SCI_Notification(s) which may be used to notify other WTRUs about the resources used for PSSCH transmission and the parameters to decode PSSCH, before transmission of PSSCH. The WTRU also may be configured to transmit one SCI in the TB used for the PSSCH. This embodiment may be motivated to increase the probability of successfully decoding PSCCH by reducing the half-duplex problem.

It should be noted that, in the following, an SCI_Notification may refer to a message transmitted before the transmission of PSCCH. When an SCI_Notification is transmitted, the WTRU may or may not be configured to transmit SCI in the TB of PSSCH.

A receiver WTRU may determine parameters of a PSCCH transmission based on decoding an SCI_Notification. In one embodiment, the WTRU may implicitly or explicitly determine the parameters used for transmission of the referred PSCCH based on decoding an SCI_Notification. Specifically, the WTRU may determine one or any combination of the following parameters used for PSCCH transmission: time-frequency resource of PSCCH; MCS; aggregation level, based on one or any combination of the following information of the SCI_Notification including an amount of or location of the time-frequency resources of SCI_Notification and QoS parameters such as priority, latency, and reliability.

In one embodiment, the transmitter WTRU may be configured to use a predefined MCS and a number of symbols and resource elements for transmission of PSCCH based on QoS of the data. In one embodiment, the transmitter WTRU may include the initial transmission of the referred PSCCH in the SCI_Notification. The receiver WTRU may determine the time-frequency resource and MCS of the PSCCH transmission based on QoS of the data and initial transmission time included in SCI_Notification. In another embodiment, the transmitter WTRU may be configured with a time interval between SCI_Notification and PSCCH based on QoS of the data. The receiver WTRU may determine the time-frequency resource and/or MCS of the PSCCH transmission based on QoS of the data.

A WTRU may determine whether or not to use an SCI_Notification. In one embodiment, a WTRU may determine whether or not to use SCI notification based on the properties of its own transmission in combination with the measured environment. Specifically, in some conditions, a WTRU may transmit a TB by first transmitting an SCI_Notification to reserve the resources for PSCCH/PSSCH and then transmit the PSCCH/PSSCH. In other conditions, a WTRU may perform transmission of a TB by performing resource selection only for PSSCH or PSCCH alone.

A WTRU may determine whether to use an SCI_Notification based on a determination of any or a combination of the following. In one embodiment a QoS and/or logical channel of the TB to be transmitted may provide a determination. For example, a WTRU may perform an SCI notification when the reliability of a transmission is above a specific threshold. For example, a WTRU may perform an SCI notification when the latency associated with a transmission is above or below a threshold, where such threshold may further depend on the amount of available resources from the sensing procedure. For example, a WTRU may be configured with a set of logical channels for which transmission with SCI_Notification is allowed. The WTRU may perform SCI_Notification for transmission of the TB if the TB contains data from one or more such logical channels.

In an embodiment, measurements at the WTRU, for example sensing or CBR measurements may aid in making a determination as to whether to use an SCI_Notification. For example, a WTRU may perform SCI notification for a TB when the percentage of available resources is above a specific threshold. The determination of the available resources may be based on detection of SCI_Notification and/or SCI transmissions indicating forward-booked resources. For example, a WTRU may perform SCI_Notification for a TB when the measured CBR or similar congestion metric is above a threshold.

A size of the TB to be transmitted may aid in making a determination as to whether to use an SCI_Notification. For example, a WTRU may perform an SCI notification for a TB when the TB to be transmitted is larger than a threshold or when a number of sequential TBs may exceed a threshold. For example, a WTRU may perform an SCI notification for a TB when the TB to be transmitted occupies a number of RBs in the same slot and/or a number of consecutive RBs in the same slot which is above a threshold.

A resource pool configuration may be used to determine whether to use an SCI_Notification. For example, the WTRU may perform SCI_Notification when one or more physical sidelink feedback channel (PSFCH) resources is or are (pre-)configured periodically with a period of smaller or equal than N slot(s), where the value of N may be (pre-)configured or provided by higher layer signaling.

A type of TB transmission, for example, a unicast, groupcast or broadcast transmission type may be used to determine whether to use an SCI notification. For example, the WTRU may perform SCI notification for unicast and/or groupcast traffic. In an example, an SCI notification may not be used for univast and/or groupcast traffic but may be used for broadcast traffic.

In one example embodiment, a WTRU may be configured with a table of threshold reliability values for a given range of CBR, for example using channel contention values. The WTRU may perform an SCI notification as long as the reliability of the packet to be transmitted is above the threshold associated with the measured CBR.

A WTRU may determine when to transmit an SCI_Notification based on QoS requirements of the packet. A WTRU may determine to transmit the SCI_Notification message based on the QoS requirement(s) of the packet. In one embodiment, the WTRU may be configured to determine the SCI_Notification transmission window based on the priority of the packet. For example, a WTRU may be configured to transmit the in the range $[n+T_{min}, n+T_{max}]$, where n is the time WTRU performs resource selection, $T_{min}$ may depend on WTRU's capability and $T_{max}$ may be determined based on the priority of the packet.

A WTRU may determine a PSSCH transmission window based on the QoS of the packet such as priority and/or latency. A WTRU may be configured to select the PSSCH and/or PSCCH resource in the resource selection window in the range $[n+T_1, n+T_2]$, where $T_1$ and $T_2$ may be determined based on the QoS of the packet such as priority and/or latency. Specifically, $T_1$ and $T_2$ may be small if the priority and/or latency requirement of the packet is high (low PPPP value). Alternatively, a WTRU may be configured to select a PSSCH and/or PSCCH resource in the range $[n+T_{max}+$ offset, $n+T2]$, where the offset may be determined based on the priority of the packet or a fixed value.

A WTRU may determine a PSSCH and/or PSCCH transmission window based on the results of the resource selection of the SCI_Notification. In one embodiment, the WTRU may determine the resource selection window for PSSCH and/or PSCCH transmission based on the results of the resource selection for the SCI_Notification(s). Specifically, the WTRU may be configured to determine the SCI_Notification transmission window in the range $[n+T_{min}, n+T_{max}]$. The value of $T_{min}$ and/or $T_{max}$ may be determined based on QoS of the packet. The WTRU may perform resource selection for SCI_Notification(s) first. Assuming that the last resource for SCI_Notification of one resource allocation process may occur at slot n+T, the WTRU may determine the resource selection window for the PSSCH and/or PSCCH transmission in the range [n+T+offset, n+T2], where the offset may be determined based on or as a function of any of the QoS of the packet (priority, latency, etc); a fixed value; the time difference between T and $T_{max}$, or between T and $T_{min}$; congestion level of the resources (for example CBR); and T2 may be determined based on a different function which may depend on any of the factors listed above for determination of the offset.

A WTRU may perform resource selection for an SCI_Notification, PSSCH and/or PSCCH in a single resource selection window by determination of a minimum offset. In one or more embodiments, the WTRU may be configured with a time offset restriction between SCI_Notification and its referred PSSCH and/or PSCCH. Specifically, the WTRU may determine to perform resource selection for an SCI_Notification, PSSCH and/or PSCCH within one resource allocation window. In some embodiments, the WTRU may be configured with a resource selection window for SCI_Notification and PSSCH and/or PSCCH in the range [n+T1, n+T2], where the value of T1 and T2 may be determined based on QoS of the data, for example, latency, priority, and reliability and/or congestion level of the resource pool, for example using, CBR.

The parameter offset may be defined as the minimum time gap between an SCI_Notification and PSSCH and/or PSCCH. In another embodiment, the parameter offset may be defined as a time gap between an SCI_Notification, PSSCH and/or PSCCH. The value of offset may be preconfigured or configured based on QoS of the data such as priority, latency, and reliability or configured by the gNB via radio resource control (RRC) signaling or via a system information broadcast (SIB).

In one embodiment, the WTRU may be configured to perform resource selection for SCI_Notification first, and then the WTRU may determine the resource selection window for PSSCH and/or PSCCH considering the restriction of the time gap or offset, between the SCI_Notification and the PSSCH and/or PSCCH. The WTRU may be configured to perform resource selection for SCI_Notification in the range [n+T1, n+T2−offset−delta], where the value of delta may be determined based on the QoS of the data, for example, latency, priority, and reliability and/or congestion level of the resource pool, for example, CBR. Assume that the resource for the SCI_Notification may occur at slot n+T, the WTRU may be configured to perform resource selection for the PSSCH and/or PSCCH in the range [n+T+offset, n+T2].

In an embodiment, the WTRU may perform resource selection for PSSCH and/or PSCCH first, and then the WTRU may perform resource selection for SCI_Notification considering the time gap restriction offset. Specifically, the WTRU may be configured to select the resource selection window for PSSCH and/or PSCCH in the range [n+T1+offset+delta, n+T2], where the delta may be determined based on the QoS of the data, for example, latency, priority, and reliability and/or congestion level of the resource pool, for example, CBR. Assume that the resource for PSSCH and/or PSCCH transmission may occur at slot n+T, the WTRU then may perform resource selection for SCI_Notification(s) in the range [n+T1, n+T−offset].

A WTRU may perform sensing by decoding an SCI and SCI_Notification. The WTRU may use RSRP/RSSI/RSCP of the SCI or SCI_Notification resource to determine the availability of the PSSCH resource indicated by the corresponding SCI or SCI_Notification. Specifically, if the RSRP/RSSI/RSCP of the SCI or SCI_Notification is greater than a threshold, a WTRU may determine that the corresponding PSSCH is considered as unavailable. Otherwise, the corresponding PSSCH resource may be considered as available.

A WTRU may determine an availability of a PSSCH and/or PSCCH resource based on the QoS parameter(s) provided in the SCI_Notification. In one embodiment, the WTRU may determine the availability of a PSSCH and/or PSCCH resource referred by the SCI or SCI_Notification based on the QoS parameter(s) provided in the SCI or SCI_Notification. Specifically, the WTRU may determine the QoS associated with the referred PSSCH and/or PSCCH. The WTRU may determine the availability of the referred PSSCH and/or PSCCH resource by comparing the RSRP/RSSI/RSCP measured in the SCI or SCI_Notification resource with a threshold, which may be determined based on the relative QoS of the referred PSSCH and/or PSCCH and the pending TB queued by the WTRU. The WTRU may directly exclude the resources referred to by the SCI or SCI_Notification if the threshold is not configured or the threshold is configured to 0 (W).

A WTRU which detects an SCI or SCI_Notification transmitted by another WTRU may decide to override such SCI/SCI_Notification and select the same/overlapping resources as reserved by the SCI/SCI_Notification. The WTRU may make such decision based on any of the following: the data to be transmitted by the WTRU is higher priority than that announced by the received SCI/SCI_Notification; an amount of available resources, for example, allowing transmission of the WTRUs TB when the resources available are below a threshold; the time difference between the decoded PSSCH and its time requirements, for example, a slack time, is above a threshold, and/or larger than the latency requirements of the WTRUs own transmissions; the measured CBR being above a threshold.

A WTRU which decides to override an SCI_Notification may perform resource selection and transmission of its own SCI notification such that it occurs at least some offset in time prior to the PSSCH/PSCCH resources reserved by the original SCI_Notification being overridden. A WTRU may further use modified resource selection criteria/parameters, for example, modified thresholds, a larger resource pool, increased TX power, a larger number of repetitions, or the like during resource selection and/or transmission of its own SCI_Notification. Such modification may be used to ensure that the SCI_Notification may be received reliably by the original WTRU that transmitted the original SCI_Notification. Alternatively, or in conjunction, a WTRU may cancel transmission which overrides an SCI_Notification if it cannot find a resource for its own SCI_Notification which occurs at least some offset prior to the reserved PSSCH/PSCCH resources.

A WTRU may reselect the PSSCH and/or PSCCH and/or SCI_Notification resource when it detects that its selected SCI_Notification or PSSCH and/or PSCCH resource may collide with another SCI_Notification or PSSCH and/or PSCCH transmission. Specifically, a WTRU may decode SCI_Notification or SCI messages from other WTRU. After decoding these messages, if the PSSCH and/or PSCCH or SCI_Notification resource of another transmission overlaps with its own PSSCH and/or PSCCH or SCI_Notification resource, the WTRU may reselect another resource for SCI_Notification or PSSCH and/or PSCCH transmission.

A WTRU may determine a collision handling procedure depending on whether the SCI_Notification has been transmitted or not. In some embodiments, a WTRU may perform two different collision handling procedures. One procedure may be executed before transmission of SCI_Notification and the other procedure may be executed after transmission of SCI_Notification. This embodiment may be motivated to differentiate the behavior of other WTRUs before the transmission of SCI_Notification. The collision handling before transmission of SCI_Notification may be motivated to avoid the collision of two WTRUs selecting the same resources where one WTRU may not have information of a transmission of another WTRU. However, collision handling after transmission of an SCI_Notification may be motivated to solve the scenario where one WTRU may need to pre-empt the resource of another WTRU.

A WTRU may perform potential collision handling after selecting one or more resources for SCI_Notification and/or PSSCH and/or PSCCH and before transmission of SCI_Notification. In one embodiment, a WTRU may perform potential collision handling after selecting a resource for an SCI_Notification and/or PSSCH and/or PSCCH and before transmission of the SCI_Notification. Specifically, the WTRU may monitor transmissions of other WTRUs to detect a potential collision after selecting a resource for SCI_Notification and/or PSSCH and/or PSCCH and before the transmission of the SCI_Notification. The WTRU may perform resource reselection of SCI_Notification and/or PSSCH and/or PSCCH or drop the packet if one or any combination of the following conditions are satisfied: the WTRU detects an SCI or SCI_Notification which refers to or reserves one resource colliding with the resource selected by the WTRU; RSRP_PSSCH or RSRP_PSCCH measured on the SCI/SCI_Notification or the referred PSSCH resource is greater than a threshold. The threshold may be pre-configured or configured by the networks via SIB or RRC messages.

A WTRU may perform potential collision handling after transmission of an SCI_Notification and before transmission of corresponding PSSCH and/or PSCCH. In an embodiment, the WTRU may perform potential collision handling after transmission of the SCI_Notification. Specifically, the WTRU may monitor transmission of other WTRU to detect a potential collision after selecting a resource for the SCI_Notification and/or PSSCH and/or PSCCH and after the transmission of the SCI_Notification. The WTRU may perform resource reselection of SCI_Notification and/or PSSCH and/or PSCCH or drop the packet if one or any combination of the following conditions are satisfied: the WTRU detects an SCI or SCI_Notification which refers to or reserves one resource colliding with the resource selected by the WTRU; the priority of the notified/reserved resource is greater than the priority of the pending TB of the WTRU; RSRP_PSSCH or RSRP_PSCCH measured on the SCI/SCI_Notification or the referred PSSCH resource is greater than a threshold. The threshold may be pre-configured or configured by the networks via SIB or RRC messages.

A WTRU may determine whether to transmit an SCI_Notification to notify of future PSSCH transmission(s). In some embodiments, the WTRU may determine to transmit one or more SCI_Notification message(s) based on one or any combination of the following: the QoS characteristics of the MAC PDU for example, VQI, priority, latency, reliability, etc.; a congestion level of the resource pool, for example, CBR; the size of the MAC PDU; the packet size and/or buffer size and/or traffic pattern.

In one embodiment, the WTRU may determine to transmit one or more SCI_Notification message(s) if the VQI of the data is within a certain range. In another embodiment, the WTRU may determine to transmit SCI_Notification message(s) if a priority, reliability or latency requirement of the MAC PDU is greater than a threshold. This embodiment may reduce the probability of collision for high priority, high reliability or high latency data by providing notice in advanced of these transmissions.

In another embodiment, the WTRU may determine to transmit SCI_Notification message(s) if a CBR of the resource pool is greater than a threshold. This embodiment may reduce collisions when the resource pool is congested. The WTRU may perform a CBR measurement of control, data, or dedicated for SCI_Notification resource pool to determine whether it should transmit SCI_Notification message(s) or not.

In another embodiment, the WTRU may determine to transmit SCI_Notification message(s) if the size of the PSSCH transmission is greater than a threshold and/or the buffer size of the WTRU is greater than a threshold. This embodiment may reduce the collision probability of large size packets. This is because the probability of a transmission collision of a large TB may be higher than that of a small TB.

Figure 6:
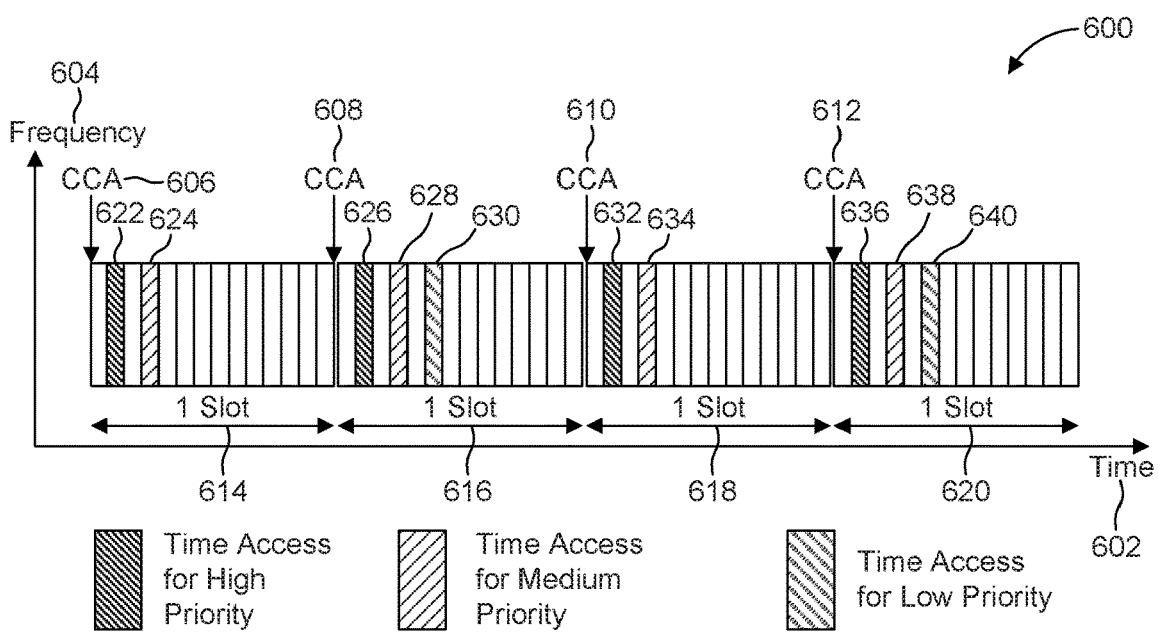
FIG. 6 is a timing diagram which illustrates channel access for one or more SCI_Notification message(s) with one or more different priorities.

FIG. 6 is a timing diagram 600 which illustrates channel access 600 for SCI_Notification message(s) with different priorities. In an embodiment, a WTRU performs resource selection for SCI_Notification message(s). The WTRU may be configured for different channel access instants for transmission of SCI_Notification message(s) based on QoS characteristics of the MAC PDU, for example, VQI, priority, latency, reliability, etc. and/or the congestion level of the resource pool, for example, CBR, and/or a resource allocation mode. In one embodiment, resource allocation modes include a network-scheduled mode and a WTRU or WTRU-scheduled mode. In one embodiment, for a certain CBR range, the WTRU may be (pre-)configured with different channel access instants for SCI_Notification message(s) based on QoS characteristic of the MAC PDU. In one example, when CBR is low, the WTRU may be (pre-)configured with the same channel access instants for SCI_Notification messages of all MAC PDU; however, as illustrated in FIG. 6, when CBR is high, the WTRU may be configured to access the channel in the second symbol of every slot if it has a high priority transmission. The WTRU may be configured to access the channel in the fourth symbol of every slot if it has a medium priority transmission. If the WTRU has a low priority transmission, the WTRU may be configured to access the channel in the sixth slot of every other slot.

In FIG. 6, the x-axis represents time 602 and the y-axis represents frequency 604. A CCA 606-612 may be performed at the onset of four slots 614-620. In slot 614, a symbol 622 may be utilized for high priority. Subsequently, in the same slot 614, a symbol 624 may be used for a medium priority transmission. In slot 616, a symbol 626 may be used for a high priority transmission. Another symbol 628 may be used for a medium priority transmission followed by a symbol 630 used for a low priority transmission. In this way, symbols for low priority transmissions may be dedicated in only every other slot, thus saving bandwidth for high priority transmissions Similarly, slot 618 may comprise a high priority symbol 632 and a medium priority symbol 634. Slot 620 may comprise a high priority symbol 636, medium priority symbol 638 and low priority symbol 640.

In another embodiment, the WTRU may be configured to rely on different channel access instants based on a combination of resource allocation modes and/or a QoS of the data. Specifically, the WTRU may be configured to access the channel one or more symbols later or earlier if the WTRU is operating in a WTRU scheduled mode. Alternatively, the WTRU may be configured to access the channel in every event slot if the WTRU is operating in a network scheduled mode and every odd slot if it is operating in a WTRU scheduled mode.

A WTRU may determine the number of SCI_Notification transmissions. In one embodiment, the WTRU may determine the number of SCI_Notification messages for transmission for one or multiple PSSCH and/or PSCCH transmissions based on one or a combination of the following: the QoS characteristics of the MAC PDU, for example VQI, priority, latency, reliability, etc.; congestion level of the resource pool, for example, CBR; the size of the MAC PDU; the packet size and/or the traffic pattern.

In one embodiment, the WTRU may determine the number of SCI_Notification messages based on a combination of the reliability of the MAC PDU and the congestion level of the resource pool, for example, CBR. Specifically, for a certain CBR range, the WTRU may be configured the number of SCI_Notification messages based on the reliability of the MAC PDU. In an embodiment, the WTRU may be configured with the number of SCI_Notification opportunities based on the size of MAC PDU. Specifically, the WTRU may be configured to transmit more SCI_Notification messages for large size packets. This embodiment may reduce the probability of collision for a large size packet, which may help to reduce the resource wastage due to the congestion of large size packets.

In an embodiment, the WTRU may perform resource selection for multiple SCI_Notification messages. Specifically, the WTRU may need to perform resource selection for N SCI_Notification messages. The WTRU may randomly select N+M possible time-frequency resources to evaluate the transmission resources. The WTRU may sequentially perform CCA in each selected time-frequency resources and may perform a transmission in each time-frequency resource when the transmission resource is available. The procedure may be terminated when the WTRU transmits all N SCI_Notification messages or the WTRU reaches the end of resource selection window. This embodiment may guarantee that the WTRU may be able to select transmission resources for all N SCI_Notification messages since if the WTRU only select N possible time-frequency resources to evaluate the transmission resources, the WTRU may not be able to select enough transmission resources for N SCI_Notification transmissions within the resource selection window due to the possibility of the channel unavailability after a CCA event. The value of M may be determined based on one or any combination of the following: the QoS characteristics of the MAC PDU (for example VQI, priority, latency, reliability, etc.); congestion level of the resource pool, for example, CBR; the size of the MAC PDU; the packet size and/or the traffic pattern. It should be noted that this embodiment may be applied for resource allocation of any transmission such as SCI_Notification, PSSCH, PSCCH, etc.

Figure 7:
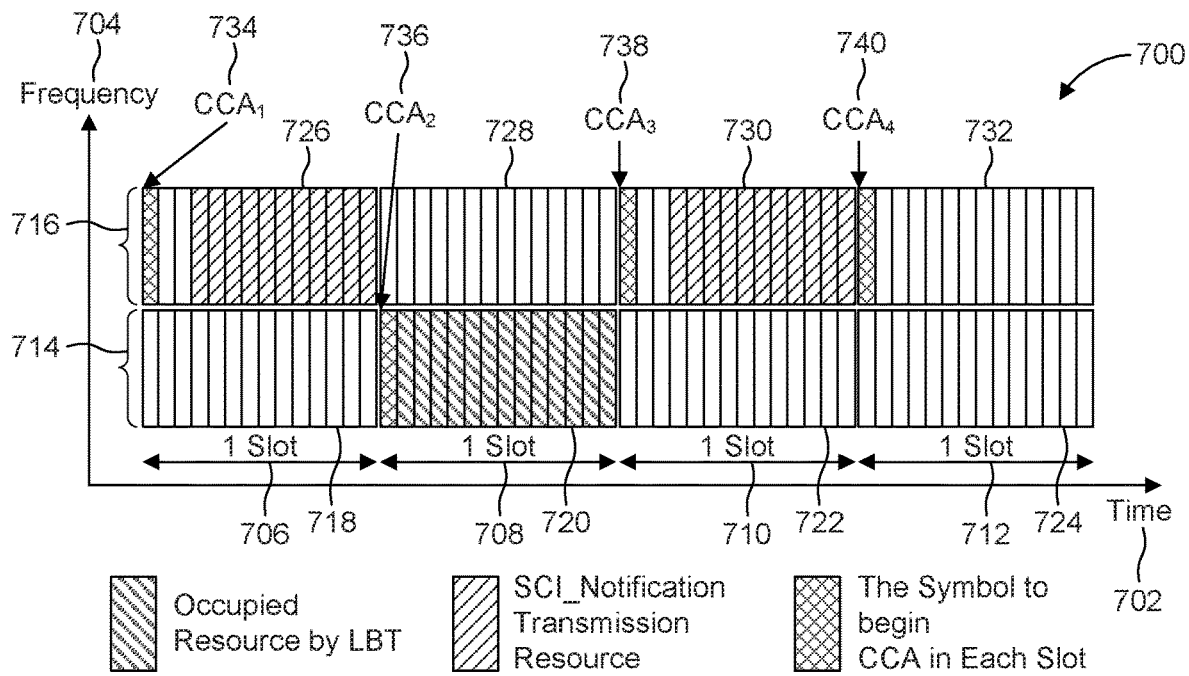
FIG. 7 is a diagram which illustrates a WTRU randomly selecting four time-frequency resources to perform a CCA for transmissions of two SCI_Notification messages.

FIG. 7 is a diagram 700 which illustrates a WTRU randomly selecting four time-frequency resources to perform a CCA for transmissions of transmission of two SCI_Notification messages. In FIG. 7, a WTRU randomly selects four time-frequency resources 726, 720, 730, 732, in time 702 and frequency 704, to perform CCA for transmissions of two SCI_Notification messages.

In the example illustrated in FIG. 7, the WTRU may need to transmit two SCI_Notification messages, based on CBR and/or QoS and/or size of the MAC PDU, the WTRU determines to select four time-frequency resources 726, 720, 730, 732 to perform CCA 734-740 for potential SCI_Notification transmissions. During the CCA procedure, the WTRU determines that a transmission resource of the second randomly selected time-frequency resource 720 is occupied. Finally, the WTRU may transmit two SCI_Notification messages in the third time-frequency resource 730. The WTRU may determine to stop CCA for the fourth CCA time-frequency resource 732 since enough SCI_Notification messages have been transmitted. A WTRU may use one or multiple SCI_Notification messages to notify about one or multiple PSSCH and/or PSCCH transmissions. The WTRU may use one or multiple SCI_Notification messages to notify about one or multiple PSSCH and/or PSCCH transmissions.

Figure 8:
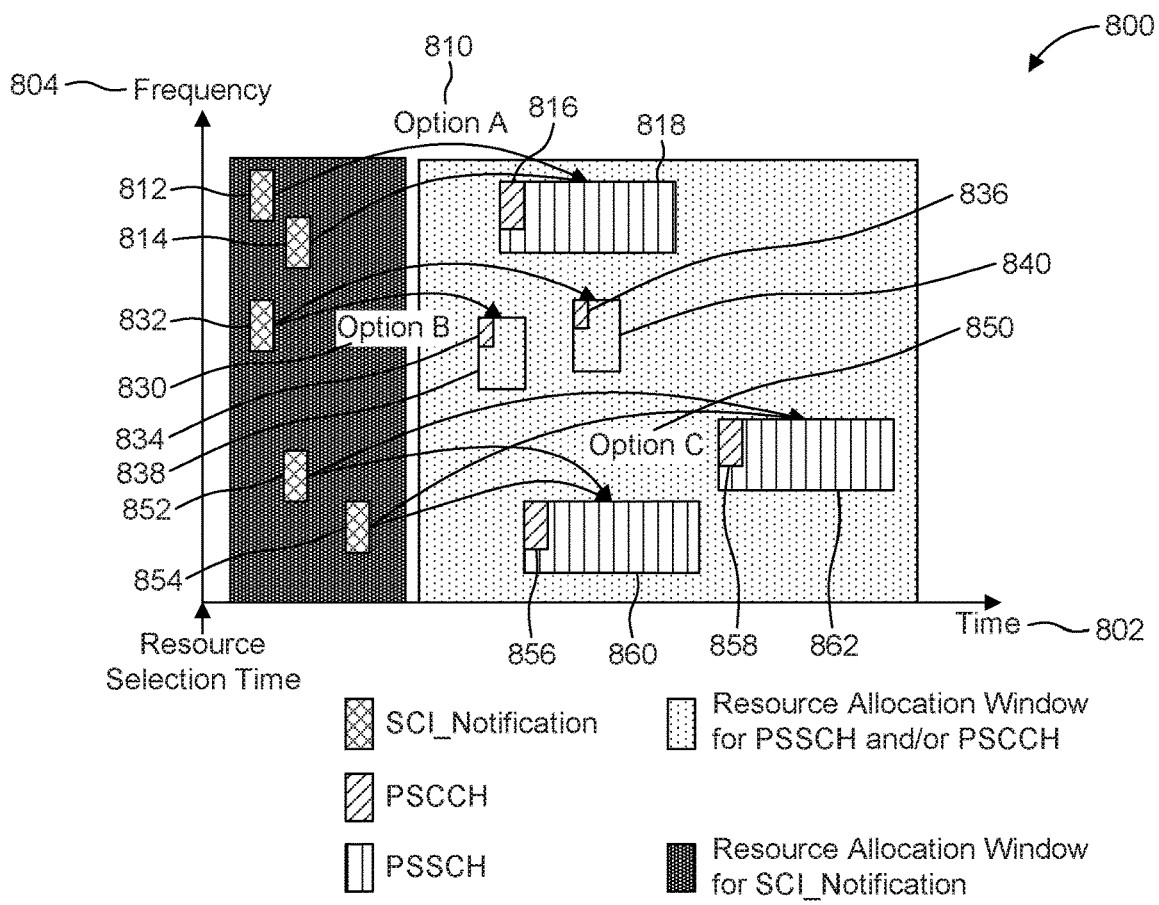
FIG. 8 is a diagram which illustrates options for an SCI_Notification to notify future PSSCH and/or physical sidelink control channel (PSCCH) transmission(s)

FIG. 8 is a diagram 800 which illustrates options for SCI_Notification to notify future PSSCH and/or PSCCH transmission(s). In one embodiment, the WTRU may use multiple SCI_Notification message(s) 812, 814 to notify about one PSCCH 816 and/or PSSCH 818 transmission as illustrated in Option A 810 of FIG. 8. This embodiment may mitigate the half-duplex problem, in which a WTRU is missing one SCI_Notification message. The WTRU may be able to detect the other SCI_Notification message to obtain information about future PSSCH and/or PSCCH transmission.

In another embodiment, the WTRU may use one SCI_Notification message 832 to notify about multiple PSCCH transmissions 834, 836 and/or PSSCH transmissions 838, 840 as illustrated in Option B 830 of FIG. 8. This embodiment may reduce a number of SCI_Notification transmissions to notifying multiple PSSCH and/or PSCCH transmissions.

In another embodiment, the WTRU may combine the two above approaches by having one SCI_Notification message to indicate multiple PSSCH and/or PSCCH transmissions and multiple SCI_Notification messages to notify one PSSCH and/or PSCCH transmission.

Option C 850 illustrates two SCI_Notification messages 852, 854 used to indicate multiple PSCCH transmissions 856, 858 and multiple PSSCH transmissions 860, 862.

An SCI_Notification message may indicate multiple transmissions of one TB. Specifically, an SCI_Notification message may explicitly or implicitly include one or any combination of the following information for multiple transmissions of one TB: the time-frequency resource of the initial transmission and possible retransmission(s); the frequency hopping pattern/index for transmission and retransmission(s); the time gap between transmission and retransmission; the time gap between two retransmissions; the number of retransmission(s); the pattern index used for the transmissions.

A WTRU may determine a transmission pattern of a TB based on a QoS of the TB. In one embodiment, the WTRU may determine the parameters for transmissions of a TB based on its QoS and/or the congestion level of the resource pool, for example, CBR. Specifically, the WTRU may determine one or any combination of the following parameters based on QoS of the TB and/or congestion level the resource pool: the size of time-frequency resource; the number of transmissions; a time gap between an initial transmission and retransmission and a time gap between two retransmissions; whether or not frequency hopping is enabled or disabled.

In one example, the WTRU may determine the number of transmissions for one TB based on the reliability of the TB. The WTRU may determine the time gap between the initial transmission and retransmission and the time gap between two retransmissions based on the latency and/or priority of the TB. Alternatively, the WTRU may decide to enable or disable frequency hopping based on the reliability of a TB.

A WTRU may change a resource selection procedure for PSCCH and/or PSSCH transmissions based on whether an SCI_Notification is transmitted. In one embodiment, the WTRU may change the resource selection procedure for PSCCH and/or PSSCH transmissions based on whether an SCI_Notification is transmitted or not. If an SCI_Notification message is not transmitted, the WTRU may select a resource for a PSCCH and/or PSCCH transmission based on any one or more of the procedures described herein. Alternatively, if one or more SCI_Notification message(s) are transmitted, the WTRU may select the resource for PSCCH and/or PSCCH as follows. A WTRU may perform resource selection for PSSCH and/or PSCCH transmissions when SCI_Notification is transmitted. A WTRU may exclude the resources forward booked by PSCCH transmissions or notified by SCI_Notification and/or via pre-emption.

In one embodiment, the WTRU may exclude the resource(s) which is or are forward booked by PSCCH transmission(s). Specifically, for the resources forward booked by PSCCH(s), the WTRU may use a similar procedure in LTE V2X, in which the WTRU may exclude the reserved resource if PSSCH_RSRP and/or PSCCH_RSRP of the reserved resource is greater than a threshold.

A WTRU may exclude the PSSCH and/or PSCCH resource notified by an SCI_Notification, pre-emption, resource reservation sequence, etc. In another embodiment, the WTRU may exclude the resources notified by SCI_Notification, pre-emption, resource reservation sequence. Specifically, the WTRU may exclude the resource or resources notified by the SCI_Notification message or pre-emption message if the RSRP measured on the SCI_Notification or pre-emption message is greater than a threshold. In one embodiment, the WTRU may be (pre)-configured with a table of RSRP threshold(s). The WTRU may then determine the index and the corresponding threshold value based on the QoS, for example, VQI, priority, latency, reliability of a transmission and the QoS of the SCI_Notification or pre-emption message.

In an embodiment, the WTRU may use a same table of PSSCH_RSRP; however, the WTRU may apply a delta value to the value in the table when comparing with RSRP of the SCI_Notification or pre-emption message. The value of delta may be (pre)-configured or calculate by the WTRU, which may depend on the transmission parameters, for example, power, MCS, number resource size, etc. of the SCI_Notification or pre-emption message(s) and the WTRU's PSSCH. This embodiment may reduce the number of threshold tables the WTRU needs to maintain and may reduce complexity of the resource selection procedure when it has to use multiple threshold tables.

Figure 9:
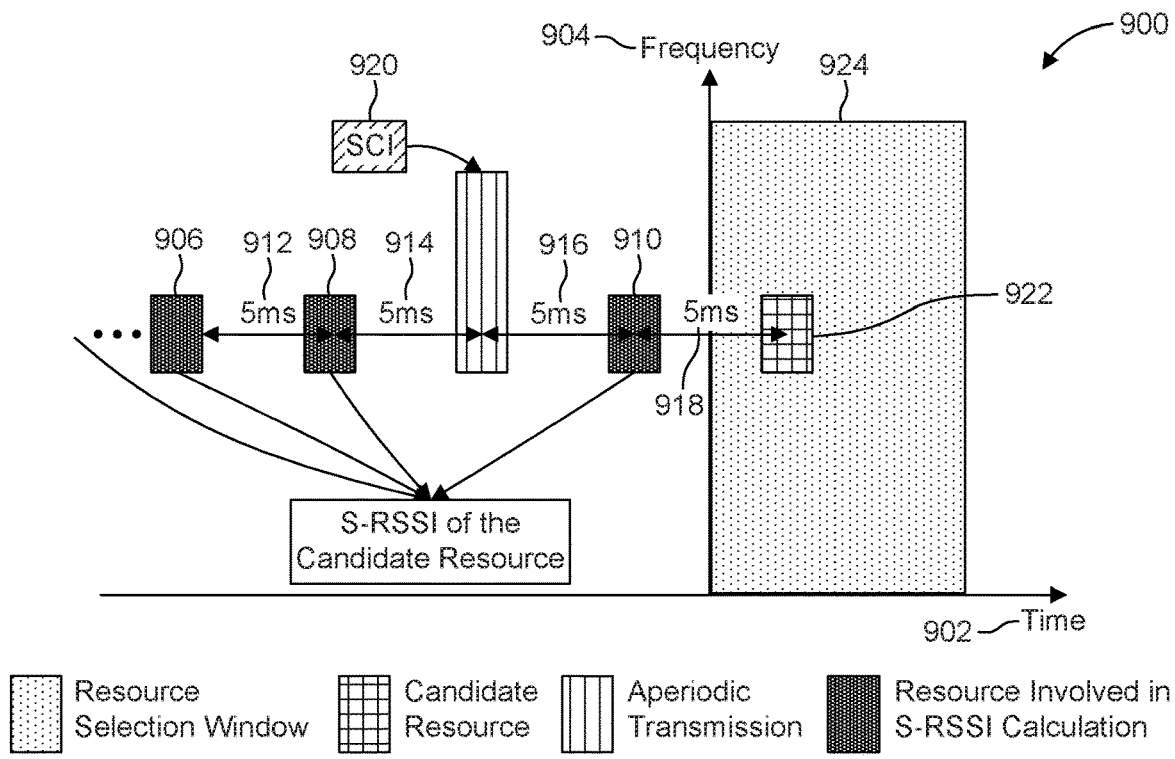
FIG. 9 is a diagram which illustrates a sidelink received signal strength indicator (S-RSSI) calculation of a candidate resource.

FIG. 9 is a timing diagram 900 which illustrates a sidelink received signal strength indicator (S-RSSI) calculation of a candidate resource. A WTRU may calculate an S-RSSI of each one of a plurality of candidate resources 906-910 to determine an X % of the candidate/available resources based on S-RSSI. In one embodiment, the WTRU may calculate the S-RSSI of each candidate resource to determine X % of the candidate/available resources to report to the upper layer, for example, the MAC layer. Specifically, the WTRU may calculate the S-RSSI of the candidate resource by averaging the measured S-RSSI in the same frequency resource of the candidate resource in the slot/time instant that may be expressed by n−T*j, where n is the time instant of the candidate resource, j is a non-negative integer, and T may be determined as the greatest common divisor of all reservation periods the resource pool may support. The value of T may be (pre-)configured or notified to the WTRU by the network via RRC or SIB. The WTRU may exclude the slots/time instant having the aperiodic/event-triggered transmissions in the frequency resource of the candidate resource. In one example illustrated in FIG. 9, the resource pool supports reservation periods of 5, 10, 20, 50, j*100 (=1 . . . 10) (ms). The WTRU determines T=5 ms and thus may delay S-RSSI calculation for each period of 5 ms periods 912-918. The WTRU determines S-RSSI of the candidate resource by averaging the measured S-RSSI of the slots which may be expressed by n−5j except the slots having event-triggered/aperiodic transmissions. The WTRU may transmit an SCI_Notification 920. The WTRU may continue to determine another candidate resource, for example candidate resource 922, among a resource selection window 924 in time 902 and frequency 924.

A WTRU may determine a PSSCH and PSCCH multiplexing scheme based on the characteristic of the data. In one set of embodiments, the WTRU may be configured to perform TDM, frequency division multiplexing (FDM) or a mixture between FDM and TDM of PSCCH and PSSCH. The WTRU may determine the multiplexing scheme between PSSCH and PSCCH based on the characteristic of the data. Specifically, the multiplexing scheme may be determined based on one or more combination(s) of the following: type of the data, for example, periodic vs. aperiodic; QoS of the data, for example, priority, latency, and/or reliability; a resource pool/BWP configuration, for example, SCS; and/or an available reserved grant.

In one embodiment, the WTRU may determine to the multiplexing scheme based on the type of data, for example, periodic vs. aperiodic, it is transmitting. For example, the WTRU may determine an FDM scheme for periodic data and a TDM for the aperiodic data. To differentiate between periodic and aperiodic data, the WTRU may be configured two orthogonal sets of logical channels for each type data. This motivation may be to reduce the number of transmissions for periodic data and resource collision for aperiodic data.

In one embodiment, the WTRU may determine the multiplexing scheme based on the availability of the reserved grant and/or QoS of the data. In one embodiment, the WTRU may determine a TDM scheme if the reserved grant is not suitable for the MAC PDU transmission or the WTRU does not have a reserved grant. The reserved grant may not suitable for a MAC PDU transmission due to one or any combination of the following. The reserved grant may not satisfy QoS of a MAC PDU, for example, priority, latency, etc. The reserved grant may be dedicated to other traffic.

In another embodiment, the WTRU may determine a TDM scheme when the WTRU does not have a suitable reserved grant and the reliability, and/or priority of the MAC PDU is greater than a threshold. These approaches may help to avoid a resource collision of a high priority and/or reliability MAC PDU. Alternatively, the WTRU may determine FDM scheme between PSSCH and PSCCH if the WTRU has a suitable reserved resource for the MAC PDU transmission.

In one set of embodiments, a WTRU may determine to perform resource selection for multiple TBs. These embodiments may help a WTRU to simplify the resource selection procedure. One multiple-TB resource may be defined as one group of resources for transmission of N TBs, where each TB transmission may require K beam sweepings. One multiple-TB resource format (MRF) may be defined as one set of (N, K). One MRF may belong to one of the following: one or more TB and each TB requires one beam transmission; one or more TB and each TB requires K>1 beam transmissions.

A WTRU may determine to perform resource selection for multiple TBs when one or more of the following conditions are satisfied: when the WTRU is configured with a service requiring resource selection for multiple TBs such as sensor sharing, platooning, etc.; when the buffer status of the data is greater than a certain threshold; when CBR of the resource pool is smaller or larger than a certain threshold; when it is configured to perform CA transmission or multiple BWP transmission; when data is received for a specific logical channel (for example such logical channel being associated with radio bearer or data having packets larger than a specific threshold); when the number of selectable carriers or BWPs available for a WTRU is below a specific value; when transmission of the TB using separate resource selection procedures or sidelink processes results in the WTRU exceeding its maximum number of sidelink processes; when the size of the arrived packet is greater than a threshold.

A WTRU may determine when to reserve one or more resources for transmissions of multiple TBs. In one embodiment, the WTRU may determine to use one SCI_Notification to reserve resources for transmissions of multiple TBs based on one or any combination of the following: when the buffer status of buffered data is greater than a certain threshold; when a WTRU is configured with a service requiring resource selection for multiple TBs, such as sensor sharing, platooning, or the like; when the buffer status of the data is greater than a certain threshold; when the CBR of the resource pool is smaller or larger than a certain threshold; when the WTRU is configured to perform a CA transmission or multiple BWP transmission; when data is received for a specific logical channel, for example, a logical channel being associated with a radio bearer or data having at least one packet larger than a specific threshold; when a number of selectable carriers or BWPs available for a WTRU is below a specific value; when the transmission of the TB using separate resource selection procedures or sidelink processes results in the WTRU exceeding its maximum number of processes; when the size of the arrived packet is greater than a threshold; when the remaining latency requirement(s) of certain TBs is or are below a threshold.

A WTRU may use an SCI associated with one TB to reserve a resource for another TB. In one embodiment, the WTRU may be configured to use one SCI associated with a PSSCH transmission of one TB to reserve one or multiple resources for transmission(s) of the same or different TB. The WTRU may use one or more reserved resources for one or more transmissions of one of the following: a retransmission of the same TB, for example, using a same or different redundancy version (RV) with the initial transmission; a transmission of another TB in the same semi-persistent scheduling (SPS) traffic; a transmission of another TB in the burst traffic, for example, both TBs may belong to the same packet from the upper layer; or a transmission of any other TB.

A WTRU may use a different mapping in the time domain to indicate a reserved resource for transmission of a TB. In an embodiment, the WTRU may be configured to use different mappings between bitfields indicated in the SCI and the timing offset between SCI transmission and timing of the reserved resource for transmission of a TB. This approach may be motivated to support the WTRU in indicating different types of reserved resource such as the reserved resource for SPS traffic, retransmission and burst traffic. For example, the WTRU may be configured to use 3 bits in the SCI to indicate the reserved time resource for retransmission of a TB and a transmission of another TB in a burst traffic, in which one value indicated by the bitfield may correspond to the timing offset in the number of time slots between SCI transmission and the reserved resource. Alternatively, the WTRU may also use 3 bits in the SCI to indicate the reserved time resource for transmission of an SPS traffic; however, one value indicated by the bitfield may correspond to one index in the table of the SPS period, which may be described in Table 1.

TABLE 1

Mapping between indices and SPS periods

| Index | Code bit | SPS period (3 ms) |
|---|---|---|
| 1 | 001 | 3 |
| 2 | 010 | 5 |
| 3 | 011 | 10 |
| 4 | 100 | 20 |
| 5 | 101 | 30 |
| 6 | 110 | 40 |
| 7 | 111 | 50 |

A WTRU may use one or more SCIs associated with different transmissions to reserve different types of transmissions. In one embodiment, the WTRU may be configured to use SCIs associated with different transmissions to reserve different resources for different types of transmissions. This approach may be motivated as a balance between the signaling overhead required in an SCI and the efficiency of resource reservation. In one example, the WTRU may be configured to use the SCIs associated with the first X transmissions to reserve the resources for one or more retransmissions and a transmission of another TB in the burst traffic. The WTRU may be further configured to use the SCIs associated with the last Y transmission(s) to reserve resource(s) for transmission of other TB(s) associated with the SPS traffic. In this approach, the value of X and Y may be (pre-)configured, which may be determined based on the number of blind retransmissions for one TB.

A WTRU may be configured to indicate the type of TB it reserves in the SCI. In one embodiment, a WTRU may be configured to reserve one or multiple resource for one or multiple types of TB transmissions. In one approach, the WTRU may indicate what type of TB it reserves in SCI by using one or multiple bits in the SCI. For example, the WTRU may use one bit to indicate whether it reserves resource for the TB in the SPS traffic or it reserve the resource for the TB in the burst traffic.

A WTRU may be configured to use one reservation table in which different sets of codepoints may be used for reservation of different types of TBs. For example, the WTRU can be configured two sets of codepoints in the table where the first set is used to reserve the resource the TB in the SPS traffic and the other set is used to reserve the resource for the TB in the burst traffic. This approach may be motivated to allow the receiver WTRU to distinguish different types of TB reservation in which the SPS reservation may be applicable to multiple period while the burst reservation may be applicable for one period only.

A WTRU may be configured to determine what type of TB to reserve based on the pool configuration. In one embodiment, a WTRU may be configured to reserve resources for TB transmission of one or any combination of the following in the resource pool: TB transmission of SPS traffic; TB transmission of burst traffic; or one or more TB retransmissions. This approach may be motivated to allow the system to enable/disable one or multiple types of resource reservations.

Resource selection may be performed in one BWP/carrier. A WTRU may consider resources for multiple transmissions as one single resource or sidelink process during a resource selection procedure. A WTRU may use the procedures/algorithms to perform resource selection for multiple transmissions. This embodiment may reduce the number of resource selections or a resource selection time for multiple transmissions.

In one embodiment, a WTRU determines MRF to perform resource selection. A WTRU may determine the value of N and K in the MRF based on one or combination of the following: buffer status of the WTRU; CBR of the resource pool; resource pool configuration.

A WTRU may first attempt resource selection with a specific number of sidelink processes and then increase or decrease the number of sidelink processes when the first attempt fails. This approach may be geared toward selecting the resource for one or multiple sidelink processes or when the WTRU still has data available at the buffer. Specifically, a WTRU may be configured to perform multiple stage-resource selection procedure for multiple transmissions, where each stage may be associated with one MRF. The WTRU may gradually reduce the number of transmissions for each size link process after each stage of resource selection. A WTRU may be (pre)-configured to perform resource selection for a predefined set of (N, K).

The failure/success of specific attempt of resource selection with a number of sidelink processes may be determined by any or combination of: (pre)configuration; QoS of the data to transmit; the CBR; the maximum number of available subchannels available in any symbol/slot over the selection period; the size of the data.

In one example, a WTRU is configured to perform resource selection for three MRFs with different values of N in the tuple (N, K), which are (5,1), (2,1), and (1,1). At first, the WTRU excludes the occupied resources and selects X % of the total resource. Then, in the first stage of resource selection, the WTRU selects one resource for transmissions of 5TBs. In one embodiment, if the first stage is unsuccessful for resource selection of one or multiple sidelink process, in the second stage, the WTRU performs resource selection for transmissions of 2 TBs, and finally, the WTRU performs resource selection for 1 TBs.

The advantage of such an embodiment is that it allows the WTRU to select a number of sidelink processes and therefore distinct resource reservations which best meet the QoS requirements of the large packet to transmit, without requiring a large number of sidelink processes, but also without reserving a large amount of resources in a given slot/symbol and potentially leaving available resources for low-latency WTRUs.

In one embodiment, a WTRU determines a resource for the first transmission and may continuously transmit on the selected frequency resource for multiple transmissions.

A WTRU may follow the disclosed resource selection procedure, which may be used to determine the resource for one TB transmission, to determine the time and frequency resource for the first TB. A WTRU may continuously transmit in the following transmission time instant of the resource pool to transmit subsequent TBs except the instant occupied/reserved by other WTRUs by decoding SCI and/or SCI_Notification. A WTRU may avoid such occupied/reserved instants by waiting for the reserved transmission to complete and resuming its transmission or it may select another subband to transmit the remaining TBs.

Figure 10:
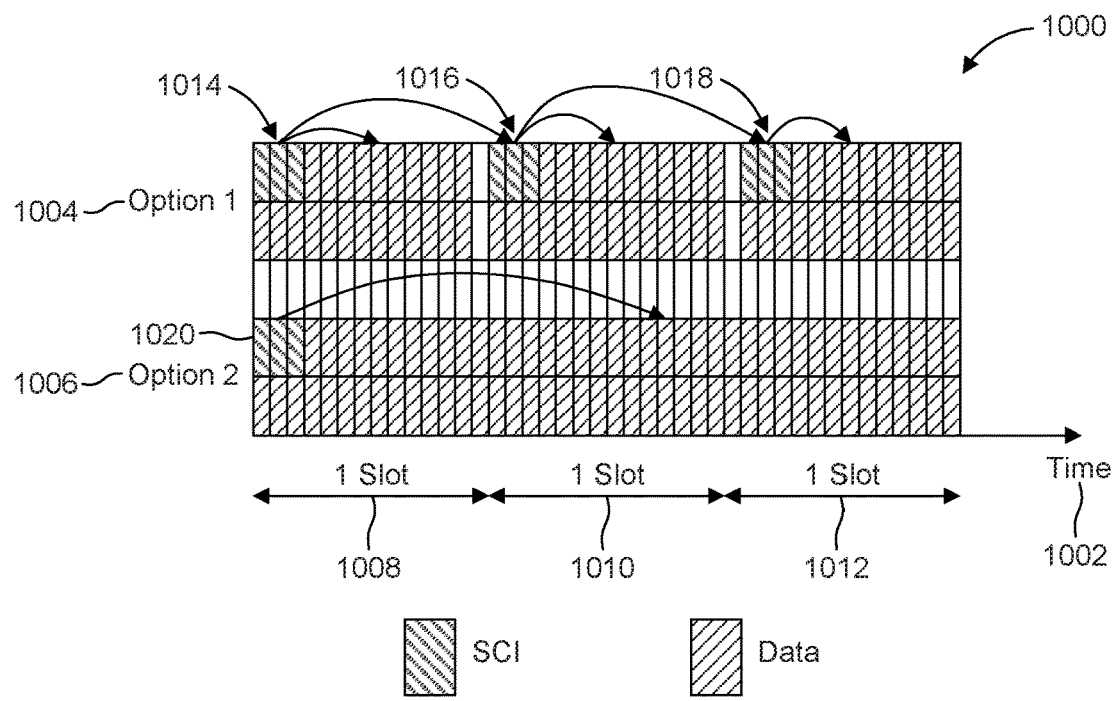
FIG. 10 is a timing diagram which illustrates an SCI indication of one or more continuous transmission(s) which follow the indication.

FIG. 10 is a timing diagram 1000 which illustrates an SCI indication of one or more continuous transmission(s) in time 1002. A WTRU may be configured to transmit an SCI to indicate that it performs continuous data transmission. In one embodiment, the WTRU may transmit, over multiple slots 1008-1012, one or multiple SCIs 1014-1018, to indicate the type of transmission, for example, contiguous vs. noncontiguous type, and the starting and ending time of the contiguous transmission. In an embodiment, the WTRU may transmit one SCI per transmission where the prior SCI indicates information of one or more following transmissions.

In the example shown in FIG. 10, a WTRU may be configured to use Option 1 1004 or Option 2 1006 to indicate the continuous transmission. In Option 1 1004, the WTRU transmits an SCI 1014-1018 in each one of three slots 1008-1012. The SCI in each prior slot reserves a resource for the following slot. In Option 2 1006, the WTRU only transmits one SCI 1020 in one slot 1008 which reserves the resource for a transmission in 3 slots 1008-1012.

A WTRU may be configured to perform resource reservation for variable size periodic traffic. A WTRU may reserve resources with different priorities. In one embodiment, a WTRU may reserve resource for variable size periodic traffic by indicating different priorities for each resource within a group of the reserved resources. Specifically, a WTRU may implicitly or explicitly indicate that it may reserve a certain resource with difference priorities, which may depend on the probability of using the resource. The priority of each resource may be indicated in an SCI or an SCI_Notification. When a WTRU performs resource reservation for the packets with priority P, it may assign priority P to the resource with a high probability of being used for the next transmission, and gradually reduce the priority to other resources with a lower probability of being used.

This embodiment may help the WTRU to reserve the resource for a certain size of a packet with the priority of the data. When the packet size decrease, the WTRU may decrease MCS. When the packet size increase, if one reserved part becomes unavailable, the WTRU may decrease MCS to support more data in one transmission. Alternatively, the WTRU may perform another resource selection to transmit the remaining data of the packet.

SCI may be designed for multiple priority reservation of a packet. To support a received WTRU in sensing procedure, the WTRU may indicate the reservation information in its SCI. In one embodiment, the WTRU may indicate a location and priority of each group of resource in one SCI. Alternatively; the WTRU may transmit one SCI for one reserved resource of the same priority.

In one example, a WTRU may reserve a resource for packets with a size of 190 or 300 bytes with priority P1. It may reserve one resource of 6 PRBs for 190 bytes with priority P1 and the other resource of 4 PRBs with priority of P2=P1+1. Alternatively, when a WTRU reserves resource for packets with sizes of either 800 or 1200 bytes with priority P1. It may reserve two transmissions for 800 byte packets with priority P1 and one more transmission for 1200-byte packet with priority P2=P1+2.

A WTRU may reserve resources for periodic SCI_Notification transmissions. In one embodiment, the WTRU may reserve one or multiple SCI_Notification booking processes for periodic packets with variable sizes. Then the WTRU may perform resource selection for PSSCH and/or PSCCH transmissions for the case in which an SCI_Notification is transmitted. The WTRU may then update the content of SCI_Notification accordingly based on the result of the resource selection procedure. This embodiment may allow a WTRU to not have to perform resource selection for SCI_Notification message(s).

A WTRU may reserve resources for periodic SCI_Notification transmissions and one or more fixed resources for PSSCH and/or PSCCH transmission. In an embodiment, the WTRU may reserve one or multiple SCI_Notification booking processes and the fixed resource for PSSCH and/or PSCCH transmission. The amount of fixed resources may be determined based on average packet size or the amount of fixed resources may be determined based on minimum packet size. When the packet arrives, the WTRU may perform resource selection or use the reserved resource based on the size of the packet and the reserved resource.

performing WTRU may perform resource selection in multiple BWPs and multiple carriers. A WTRU may determine when to perform resource selection for multiple carriers or BWPs. A WTRU may determine resource selection for multiple carriers/BWPs when one or combination of the following conditions are satisfied: the buffer size is greater than a threshold, or WTRU may decide to perform resource selection of multiple TBs simultaneously; carrier aggregation (CA) is configured for the WTRU; the WTRU is configured with a certain application requiring transmission of a large amount of data.

A WTRU may perform resource selection to minimize the half-duplex problem. A WTRU may simultaneously select a resource in multiple carriers or BWPs. A WTRU may perform resource selection in multiple carriers/BWPs simultaneously to minimize the half-duplex problem, in which the WTRU may not transmit/receive in a carrier when it receives/transmits in an adjacent carrier. Specifically, when the WTRU has multiple TBs for transmission, it may determine to perform resource selection of N carriers/BWPs simultaneously. A WTRU may first determine the available transmission time instants, which have resource transmissions in each of a plurality of carriers. Then, WTRU may randomly select one or multiple transmission time instants for transmission in all N carriers/BWPs. When the number of available transmission time instants is smaller than a threshold, the WTRU may reduce N to perform further resource selection.

A WTRU may sequentially select a resource for use in a multiple carrier/BWP transmission. In an embodiment, a WTRU may perform resource selection for multiple TBs sequentially in each carrier/BWP. A WTRU may perform resource selection for one carrier/BWP as described. Then the WTRU may perform resource selection for the second carrier/BWP to minimize the half-duplex problem. The WTRU may prioritize to select the transmission time instant, which may be selected for transmission by the first carrier.

In one embodiment, a WTRU may perform different resource allocation schemes for the initial transmission and retransmission(s). Specifically, the WTRU may perform resource selection for the initial transmission by using any procedure described, which may be based on decoding SCI, SCI_Notification, CCA, backoff and/or pre-emption. For the retransmission(s), the WTRU may first exclude the occupied resources, which may be determined by decoding SCI or SCI_Notification, pre-emption messages from other WTRUs. The frequency resource for the retransmission(s) may be the same as the frequency resource of the initial transmission or may be selected randomly in the resource pool. The time resource for the retransmission(s) may be selected randomly, which may satisfy one or any of the following conditions: the time gap between the initial transmission and the first retransmission is within the range [1, X]; the time gap between two consecutive retransmissions are within [1, Y], where the value(s) of X and Y may be configured, for example preconfigured.

A WTRU may use the SCI or SCI_Notification of the initial transmission to reserve the resource for the retransmission(s). The WTRU may use the SCI or SCI_Notification of the initial transmission to reserves the resource(s) of the retransmission(s). Specifically, the WTRU may use an SCI or SCI_Notification of the initial transmission to implicitly/explicitly indicate one or any combination of the following information: the number of retransmissions; time-frequency resources of the retransmissions; time gap among different transmissions; frequency hopping of the transmissions for the TB.

In one embodiment, the WTRU may be preconfigured with the number of retransmissions and/or the time gap among different transmissions based on QoS of the TB, for example, reliability, priority, and/or latency. The receiver WTRU may use the QoS indicated in the SCI or SCI_Notification to determine the number of retransmissions, and time-frequency resources of the retransmissions reserved by the initial transmissions of the transmitter WTRUs.

A WTRU may use an SCI_Notification to reserve one or more resources for the initial transmission of a TB and/or retransmission(s). Specifically, for the initial transmission, the WTRU may transmit one or more SCI_Notification message(s) before transmission of PSSCH and/or PSCCH, in which the SCI_Notification message(s) may be used to reserve/indicate the time-frequency resource(s) of the initial transmission and/or retransmission(s). The WTRU may use the SCI of the initial transmission to reserve the resource for the retransmission(s). For example, as illustrated in option 1 1004 of FIG. 10, the WTRU uses SCI_Notification of the initial transmission to reserve the time-frequency resource for both the initial transmission and the two retransmissions. In option 2 1006, a single SCI 1020 may reserve a time-frequency resource for data of multiple slots 1008-1012 without sending a follow up SCI.

Methods to select one or more (pre)-configured resources are disclosed herein. In one embodiment, a WTRU determines to perform sensing-based or no-sensing resource selection based on (pre-)configuration and/or CBR measurement and/or resource reservation signal/message, for example, using an SCI_Notification message, a pre-emption message or a resource reservation sequence.

In one embodiment, the WTRU may be (pre-)configured with a set of resources for transmission. The WTRU may be indicated that the (pre-)configured resource is dedicated to the WTRU or shared among different WTRUs. In one embodiment, the WTRU may determine to perform no-sensing resource selection by randomly selecting one or multiple transmission resources if any one or more of the following conditions are satisfied: the (pre-)configured resources are dedicated to the WTRU; CBR measured in the resource pool is below a threshold; the number or size of the resource reservation signal/message, for example, if a SCI_Notification message, pre-emption message or resource reservation sequences are below than a threshold.

In an embodiment, the WTRU may determine to perform sensing-based resource selection if one or any combination of the following conditions are satisfied: the (pre-)configured resources are shared among different WTRUs; CBR measured in the resource pool is greater than a threshold; the number of resource reservation signal/message, for example, SCI_Notification message, pre-emption message, resource reservation sequences are greater than a threshold.

The thresholds, for example, a CBR threshold, number of SCI_Notification messages, number of pre-emption messages, etc. may be pre-configured or configured for the WTRU via RRC or SCI. The thresholds may be determined based on the QoS of the packet, for example, VQI, priority, latency, etc.

A WTRU may determine a channel access scheme based on QoS of the data. In one embodiment, the WTRU may be configured for different channel access methods based on a QoS of the packet, for example determined via VQI, priority, latency, etc. Specifically, the WTRU may determine to perform random selection if the priority and/or latency of the packet is high. Alternatively, the WTRU may determine to perform CCA only if the priority and/or latency of the packet is medium. Finally, the WTRU may need to perform CCA and backoff procedure if the priority and/or latency of the packet is low. The priority and/or latency thresholds of the packet to perform different channel access schemes may be (pre-)configured or configured by the network via RRC or SIB.

Resource selection may be based on one or more patterns. In some embodiments, the WTRU may be configured to perform pattern-based transmissions. Specifically, pattern-based transmissions may be defined as transmissions using one or more pre-defined times and possible frequency resources.

In one embodiment, the WTRU may be configured a pool of patterns, in which each pattern may be defined within a window. The window may be repeated, which allows the patterns to be repeated. Within a pattern window, each pattern may be defined as a set of transmission periods and possible transmission frequencies within a pattern window. One transmission interval may consist of or may be comprised of one or multiple slots.

Figure 11:
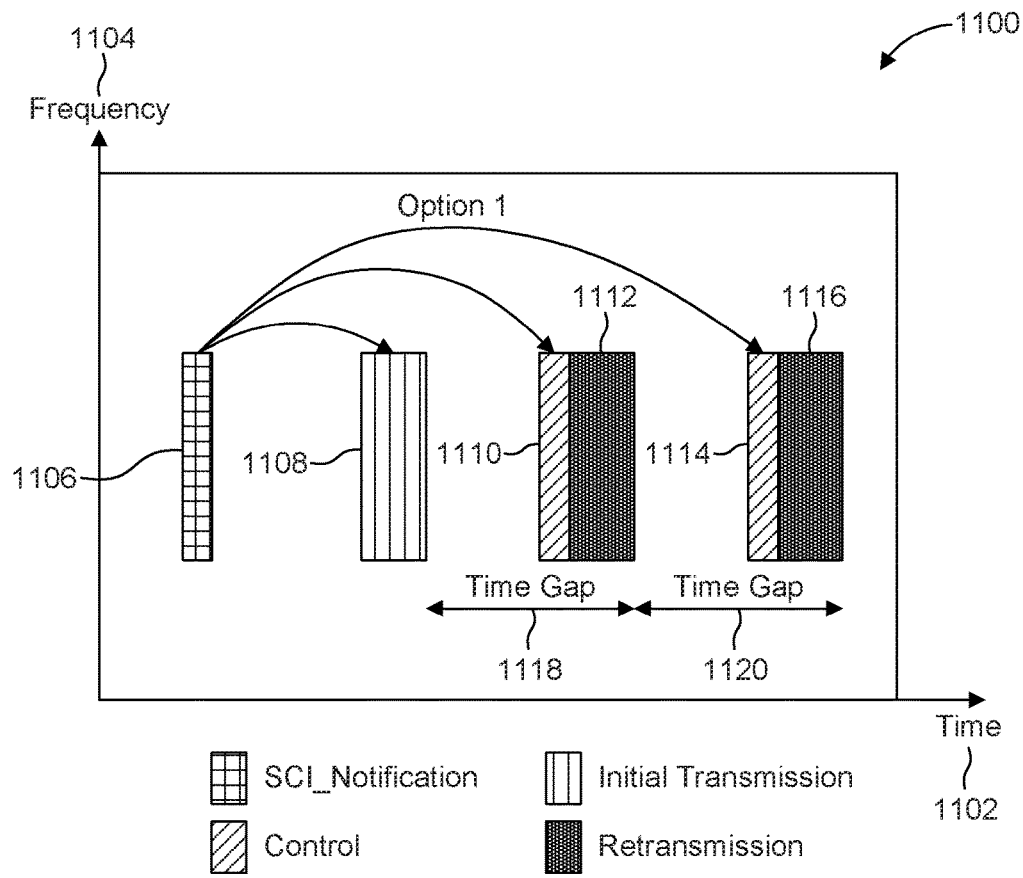
FIG. 11 is a diagram which illustrates a method for a WTRU to use an SCI_Notification of a first transmission to reserve resource for subsequent retransmissions.

FIG. 11 is a diagram 1100 which illustrates a method employed by a WTRU for using an SCI_Notification of a first transmission to reserve resource for retransmissions. In the example illustrated in FIG. 11, the WTRU may transmit an SCI_Notification 1106 which indicates resources for an initial transmission 1108. The SCI_Notification 1106 may also indicate resources for transmission of first control information 1110 and a first retransmission 1112. The SCI_Notification 1106 may also indicate resources for transmission of second control information 1114 and a first retransmission 1116. The SCI_Notification may indicate a time gap 1118 between the initial transmission 1108 and the end of the first retransmission 1112. Another time gap may be indicated between the end of the first retransmission 1112 and the end of the second retransmission 1116. Other gaps in time 1102 or frequency 1104 may be indicated additionally or alternatively.

The WTRU may be configured with a resource pool consisting of or comprised of a 4-interval pattern window, in which each pattern may be represented by 4 bits and each bit represents the transmission opportunities in the pattern in two slots. The WTRU may be configured to use one set of patterns in the set of possible patterns in Table 2. In each pattern, a bit set to 1 indicates a transmission interval and a bit set to 0 indicates a non-transmission interval.

Figure 12:
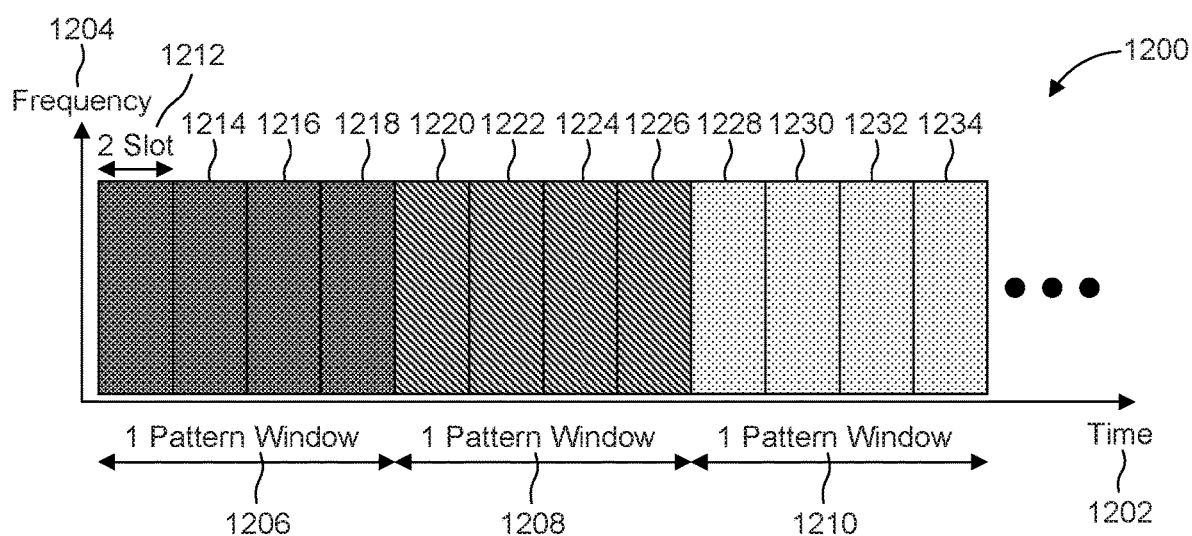
FIG. 12 is a diagram of an example pattern design.

FIG. 12 is an illustration of an example pattern design 1200 which demonstrates a 4-interval window resource pool. FIG. 12 demonstrates three pattern windows 1206-1210 in time 1202. Each interval 1212-1234 of each pattern window 1206-1210 may occupy two time slots. Other pattern(s) and pattern options may be applicable in other embodiments.

TABLE 2

The set of possible patterns for 4-interval window

| Index | Pattern | Index | Pattern | Index | Pattern | Index | Pattern |
|---|---|---|---|---|---|---|---|
| 1 | 1111 | 5 | 0111 | 9 | 0110 | 13 | 0100 |
| 2 | 1110 | 6 | 1100 | 10 | 0101 | 14 | 0010 |
| 3 | 1101 | 7 | 1010 | 11 | 0011 | 15 | 0001 |
| 4 | 1011 | 8 | 1001 | 12 | 1000 | | |

A WTRU may determine a transmission pattern based on QoS of the TB and/or CBR of the resource pool. In one embodiment, the WTRU may determine the transmission pattern based on the QoS of the TB and/or the CBR of the resource pool. Specifically, the WTRU may be configured with a table indicating the minimum and the maximum number of transmissions for one TB based on QoS and/or CBR of the resource pool. The WTRU may select one or more patterns having the number of transmissions within the configured range.

A WTRU may determine a set of patterns based on QoS of the data to be transmitted. The WTRU may be (pre-)configured with multiple pattern sets, wherein each pattern set may be associated with one or any combination of the following parameters: duration of the pattern window; duration of one transmission interval; number of transmission resources for each pattern, for example, maximum and/or minimum number of (pre-)configured transmission resources for a pattern in the resource pool; the maximum/minimum time gap between transmissions in a pattern; the size of frequency resource for each transmission.

In one embodiment, the WTRU may determine the transmission resource pool based on the QoS of the TB. Specifically, the WTRU may determine one or any combination of the following parameters for transmissions of one TB: the number of transmissions for the TB; the duration of one transmission for the TB; the frequency range of one or more transmissions; the total transmission time; and/or based on frequency hopping, for example, based on the hopping pattern or based on whether frequency hopping is employed. Based on one or any combination of the noted transmission parameters, the WTRU may determine a pattern set to satisfy the QoS requirements of the TB.

A WTRU may determine a set of usable patterns based on QoS of the TB and/or the resource allocation time. In some embodiments, the WTRU may determine the set of usable patterns based on one or any combination of the following: QoS of the TB such as priority, reliability, and/or latency; and/or a resource selection time as compared to the pattern.

In one embodiment, the WTRU may determine a set of usable patterns and/or a subset of one or more pattern(s) based on a reliability of the TB. Based on a reliability of the TB, the WTRU may determine a minimum number of transmissions for such TB. Afterward, the WTRU may determine the set of patterns, whose number of transmissions is greater than or equal to the minimum number of transmissions for possible transmissions of the TB. This embodiment may be motivated to allow the WTRU to select the transmission patterns satisfying the reliability requirement of the TB. For example, for a 4-interval window resource pool described in FIG. 12, the WTRU may need to select transmission resources for one TB which requires at least 2 transmissions. Therefore, the WTRU may determine the set of usable patterns, whose indexes belong to the set {1, 2, 3, 4, 5, 6, 7, 8, 9, 10, 11}. The mapping of an index to a pattern may be described in Table 1.

In an embodiment, a WTRU may determine the set of usable patterns based on the resource allocation time of a TB. Specifically, if the WTRU may need to perform resource selection in a middle of a pattern window, the WTRU may exclude patterns having a transmission time before the resource selection time. For example, a WTRU may need to perform resource selection during the first interval and it may need to select patterns having at least two transmission intervals. The set of patterns having at least two transmission intervals may be {1, 2, 3, 4, 5, 6, 7, 8, 9, 10, 11}. The WTRU may exclude the set of patterns having transmission in the first interval, for example, {1, 2, 3, 4, 6, 7, 8, 9}. Therefore, the set of usable patterns is {5, 9, 10, 11}.

A WTRU may determine a set of usable patterns based on a priority of the TB. In an embodiment, the WTRU may be (pre-)configured with the set of usable patterns based on the priority of the TB. Specifically, each pattern may have one initial transmission interval, the WTRU may be (pre-)configured to select the patterns having different initial transmission intervals based on the priority of the TB. For example, for a high priority TB, the WTRU may be allowed to select patterns having the initial transmission in the first interval, while a low priority TB may be allowed to select patterns having the initial transmission in the second interval. This embodiment may be motivated to allow the WTRU to reduce the probability of collision in selecting patterns of TBs with different priorities.

In one embodiment, the WTRU may determine to combine multiple patterns in different pattern windows to transmit one TB. The WTRU may use the same or different pattern indexes in the pattern windows to transmit one TB. The WTRU may perform pattern combination to satisfy the QoS of the TB. Specifically, the WTRU may perform pattern combination if the WTRU is not able to select a pattern in a pattern window to satisfy the QoS of the TB. The WTRU may indicate its transmission across multiple pattern windows in an SCI or SCI_Notification to support the other WTRU in sensing and decoding messages.

In one embodiment, a WTRU may indicate a usage of a pattern or a subset of a pattern in an SCI or SCI_Notification.

Specifically, the WTRU may implicitly or explicitly indicate one or any combination of the following information in the SCI and/or SCI_Notification: pattern index, frequency range used for one transmission; number of transmission resources and a frequency hopping indication.

Figure 13:
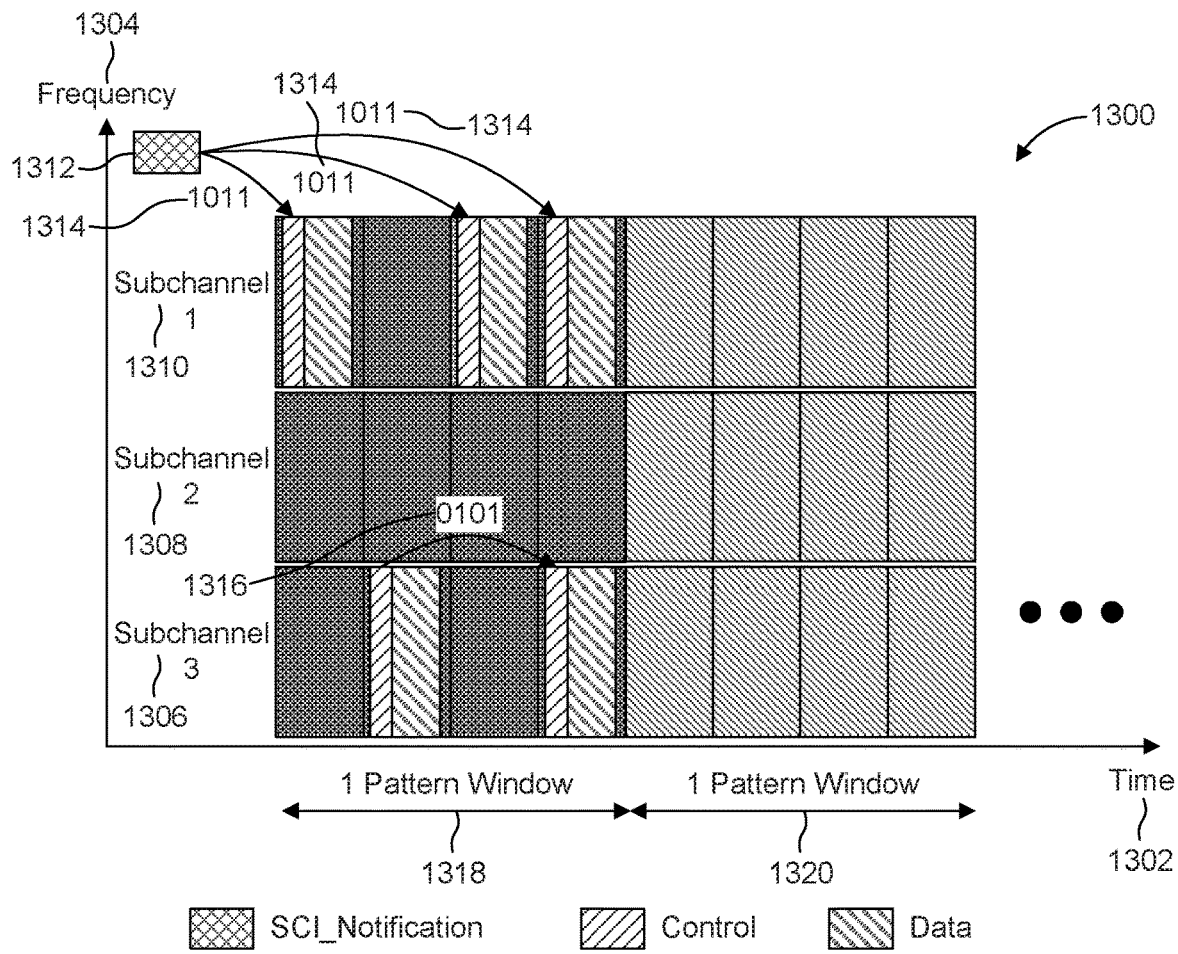
FIG. 13 is a diagram which illustrates a WTRU determining the availability of a pattern based on decoding an SCI or SCI_Notification.

FIG. 13 is a timing diagram 1300 which illustrates a WTRU determining the availability of a pattern based on decoding an SCI or SCI_Notification 1312. In FIG. 13, the x-axis represents time 1302 and the y-axis represents frequency 1304. Three subchannels 1306-1310 are illustrated in frequency 1304. The WTRU may determine the availability of a pattern, for example, pattern 1011 1314 and pattern 1316- and/or a group of patterns and/or a subset of a pattern based on sensing. In one embodiment, the WTRU may determine the availability of a pattern and/or a group of patterns based on decoding SCI and/or an SCI_Notification 1312. Specifically, if the WTRU may decode an SCI or an SCI_Notification 1312 which reserves a transmission pattern and RSSI/RSRP of the reserved resource is greater than a threshold, the WTRU may determine that the reserved pattern and the patterns having transmissions in one resource of the reserved pattern as occupied.

In the example illustrated in FIG. 13, one WTRU may reserve transmission pattern 1011 1314 in subchannel 1 1310 by using an SCI_Notification 1312 and one WTRU may reserve transmission pattern 0101 1316 in subchannel 3 1306 by using an SCI. The WTRU determines pattern 1011 1314 in subchannel 1 1310 as occupied, it may also determine that for subchannel 1 1310, all the other patterns except pattern 0100 are occupied. Similarly, for subchannel 3 1306, all patterns except 1000, 0010, and 1010 are considered as occupied. A WTRU may not receive any information about the availability of subchannel 2 1308 from SCI_Notification 1312. Alternatively, the absence of a bitmap may indicate that subchannel 2 1308 is either available or not available. Patterns may be applicable over a single pattern window, for example, 1 pattern windows 1318, 1320.

In an embodiment, the WTRU may determine the availability of a group of patterns by using CCA. Specifically, at first the WTRU may determine the availability of a resource by using CCA. If the resource is considered as occupied, the WTRU may determine a group of patterns, which may use the resource as occupied. For example, if the WTRU is configured with a 4-interval pattern window and the WTRU determines that the first interval is occupied, the WTRU may determine that all the patterns having the transmission in the first interval as unavailable, i.e., the WTRU may consider pattern index 1, 2, 3, 4, 6, 7, 8, 12 described in Table 1 as occupied. The WTRU may employ a counter for reverting to resources of a group which were otherwise determined as occupied so as to recover previously occupied resources.

Figure 14:
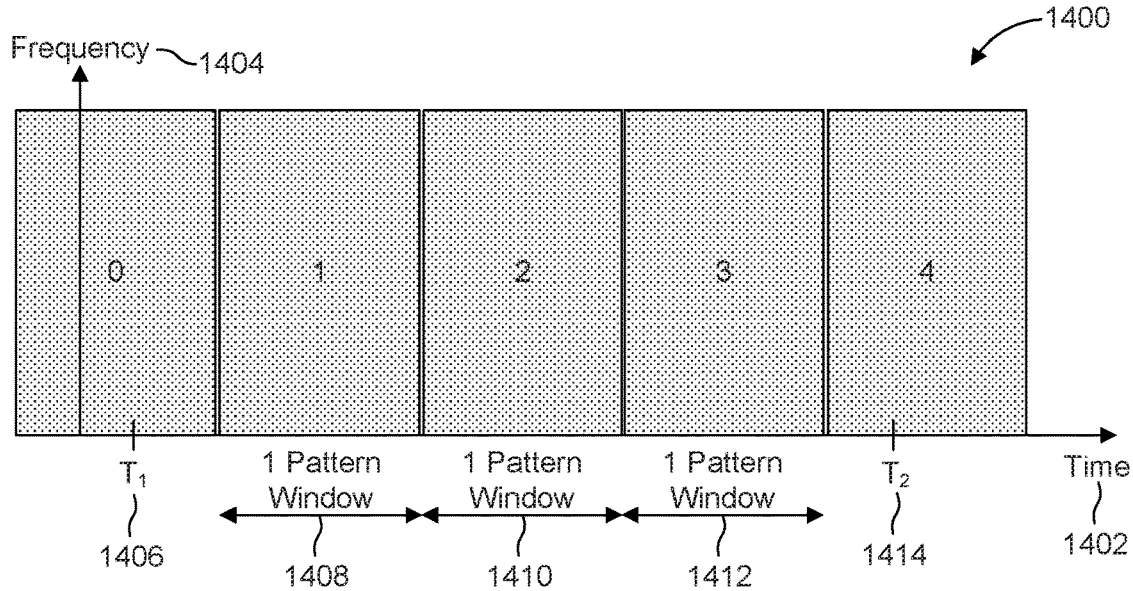
FIG. 14 is a diagram which illustrates a WTRU randomly selecting one pattern window for a plurality of transmissions of one TB.

FIG. 14 is a diagram 1400 which illustrates WTRU randomly selecting one pattern window for transmissions of one TB in time 1402 and frequency 1404. A WTRU may select a pattern of one or more windows to transmit a TB based on its QoS. In one embodiment, the WTRU may determine a resource selection window [T1, T2] inclusive or exclusive of pattern windows 1406-1414, which may be able to satisfy the QoS of a TB. The WTRU may then determine the set of pattern windows to perform one or multiple patterns selections. The set of pattern windows may be selected within the resource selection window [T1, T2]. The WTRU may randomly select one or multiple pattern windows 1406-1414 within [T1, T2] to perform pattern selection. As illustrated in FIG. 14, the WTRU may randomly select pattern window 1 1408, pattern window 2 1410, or pattern window 3 1412 for a transmission of one TB. Other selection methods aside from random selection may be employed.

In another embodiment, the WTRU may perform pattern selection and/or pattern window selection for transmissions of one TB by decoding an SCI and/or an SCI_Notification and using a backoff counter to delay transmission. Specifically, the WTRU may perform follow the following steps to perform pattern window selection and/or pattern selection.

Initially, the WTRU may generate a backoff counter to determine whether the WTRU is able to select a pattern window and/or a pattern for transmission. Specifically, if the backoff counter is smaller than or equal to zero, the WTRU may be able to select a pattern window and/or a pattern for transmission. Otherwise, the WTRU may not be able to select the pattern window and/or a pattern. The value of the backoff counter may be randomly selected within a window [0, W], where the value of W may be (pre-)configured or configured by the network via SIB or RRC message. In embodiments, a transmission may be made when the backoff counter may fall below a value other than 0. Alternatively, a backoff counter may be incremented, instead of decremented, and may still be consistent with the embodiments herein.

The WTRU may then determine the set of available patterns within a pattern window by decoding an SCI and/or an SCI_Notification and/or by performing CCA. Specifically, the WTRU may exclude all patterns having transmission resources potentially colliding with the patterns indicated by SCI and/or SCI_Notification. It may also exclude the resources or pattern decided as occupied by performing CCA.

The WTRU then may decrease the backoff counter, in which the decrease may be based on one or any combination of the following: QoS of the TB; the number of available resources; the number of available patterns; the number of deferred pattern windows; radio activity of the resource pool/carrier/BWP, for example, a determined CBR.

If the backoff counter is smaller than or equal to zero, the WTRU may randomly select one available pattern within the current pattern window or randomly select one available pattern in the following pattern window for transmission of the TB. Otherwise, if the backoff counter is greater than zero, the WTRU wait until the next pattern window to perform SCI and/or SCI_Notification decoding or CCA.

In NR V2X, the WTRU may support a fixed and/or variable size periodic traffic. The network may require the WTRU to report the traffic information to support the network in scheduling.

A WTRU may report multiple packet sizes in a WTRU assistance information element for periodic traffic of a variable size. In one embodiment, the WTRU may report different traffic information in WTRU assistance information to inform the network about the characteristic. Specifically, if the upper layers indicate the presence of fixed size periodic traffic, the WTRU may report the size of the packet. However, if the upper layers indicate the presence of variable size periodic traffic, the WTRU may report N packet sizes. The value of N may be determined based on one or any combinations of the following: the range of packet sizes supported from upper layers; and/or the QoS range of the traffic.

In one example, a WTRU may be configured with an SPS configuration that alternates between grant sizes reported by the WTRU assistance information, or related to the reported sizes in SPS configuration. Specifically, a WTRU may assume a grant size for successive resources of an SPS configuration to match or related to each of the reported sizes. The WTRU may further receive signaling in the SPS configuration of the pattern of different grant sizes within the SPS configuration. Alternatively, the WTRU may assume a fixed pattern (one successive grant of each size) or may assume the pattern to match information provided in the WTRU assistance information.

A WTRU may be configured with one or more grant size(s) associated with an SPS configuration explicitly in the configuration itself. Alternatively, a WTRU may derive the grant sizes based on a first grant size provided by the network. For example, the first grant size may be associated with the first requested grant size in WTRU assistance information. Subsequent grant sizes may be determined based on the relation between the requested grant sizes provided in the WTRU assistance information. If a WTRU requests X and 2X in WTRU assistance information, and is granted Y in the SPS configuration, it may assume Y and 2Y as the successive grant sizes of the SPS.

In one embodiment, the WTRU may implicitly or explicitly indicate the packet size of the variable size periodic traffic in an SR. In an embodiment, the WTRU may be configured with a mapping of SR information bits to packet size. When the WTRU reports the SR, the WTRU may set the SR information bits to the corresponding packet size. In this way, a receiver which may decode the bit length may determine the packet size. Alternatively, the WTRU may be configured with different SR configurations and each configuration may be associated with one or multiple packet sizes, for example using a size range. Then, the WTRU may use an appropriate configuration to indicate the size of the packet when the packet is available at the buffer.

Figure 15:
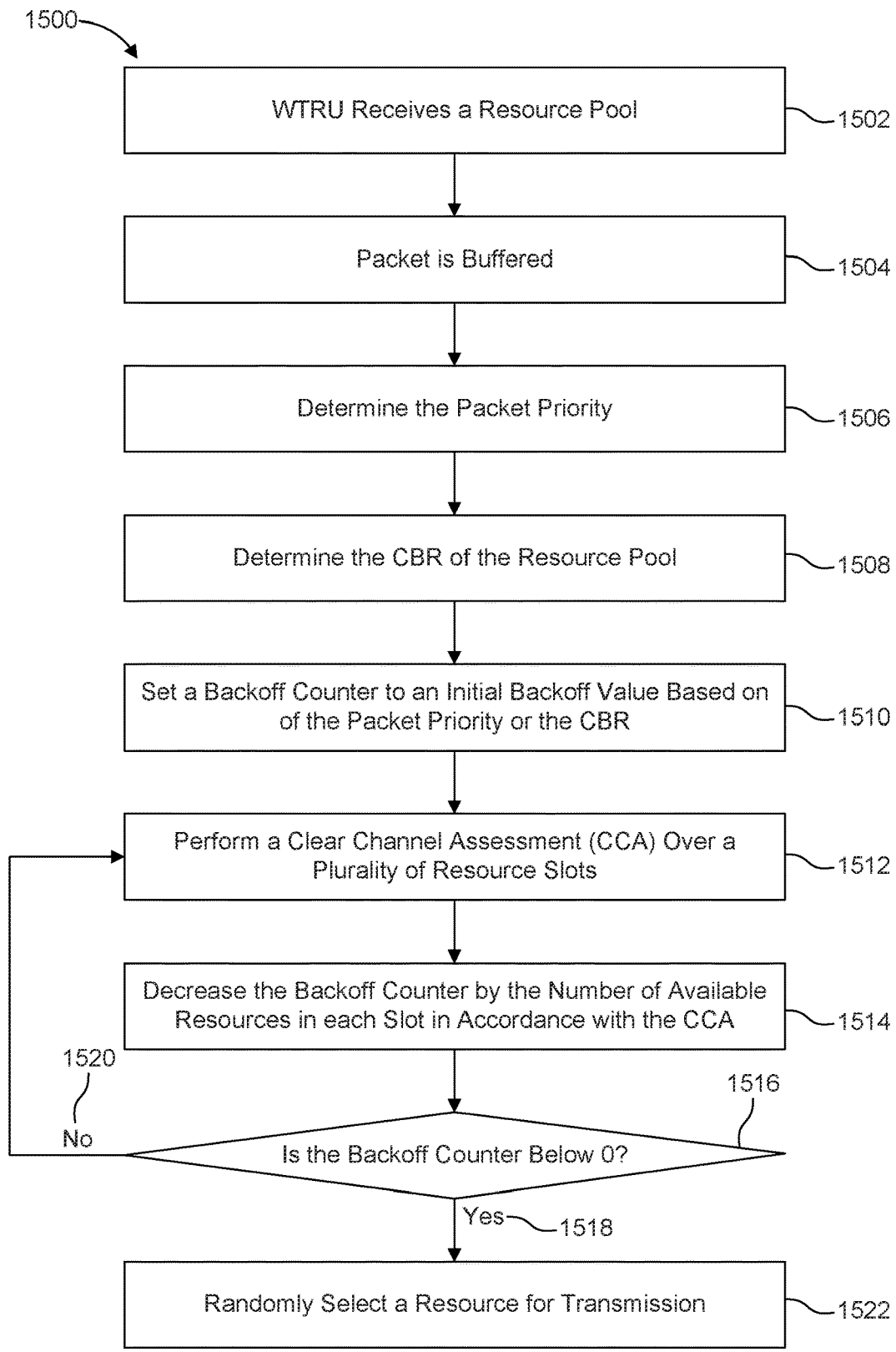
FIG. 15 is a flowchart which illustrates resource selection based on packet priority.

FIG. 15 is a flowchart 1500 which illustrates resource selection based on packet priority. In an embodiment, a WTRU may receive 1502 a resource pool configuration which provides the WTRU with one or more time intervals, slots, bandwidth configurations, reservation periods or the like. When the WTRU determines that a packet is buffered 1504 or is received from higher layers, the WTRU may inspect 1506 the packet priority. A CBR of the resources indicated by the resource pool may be determined 1508. Based on the packet priority or CBR, the WTRU may set 1510 a backoff counter to an initial backoff value. In an embodiment, the WTRU may employ a look up table to determine the backoff counter. The WTRU may then perform 1512 a CCA over one or more resource slots. When the CCA indicates that resources are available, the backoff counter may be decreased 1514 by the number of available resources in each slot. The WTRU may then determine 1516 whether the backoff counter is equal to or has fallen below 0. If the answer is yes 1518, the WTRU may randomly select 1522 a resource for transmission. If the answer is no 1520, the WTRU may continue performing 1512 CCA.

Figure 16:
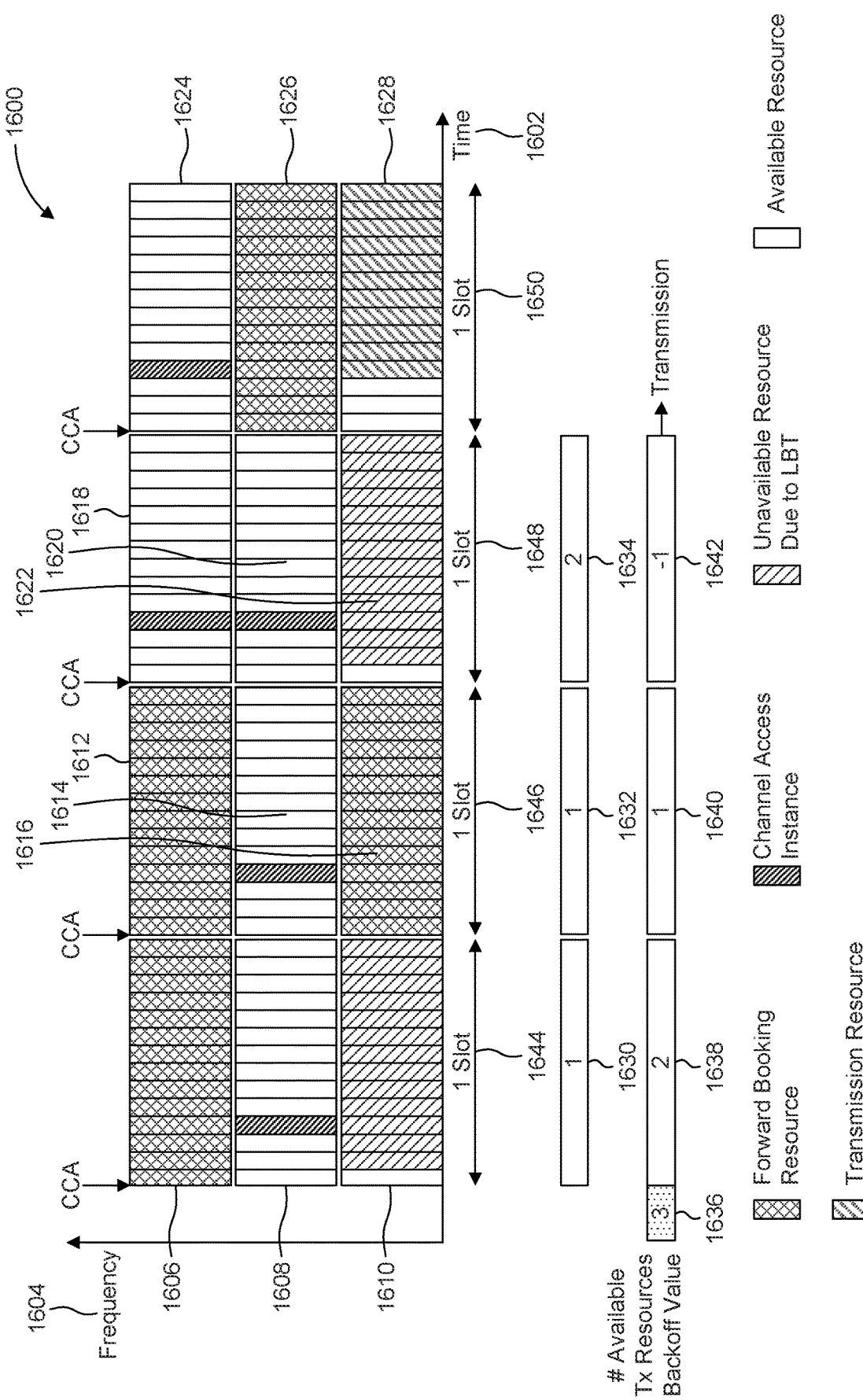
FIG. 16 is a timing diagram which illustrates a transmission procedure using a backoff counter.

FIG. 16 is a timing diagram 1600 which illustrates a transmission procedure using a backoff counter. In a first slot 1644 in time 1602, CCA may be performed along three subbands 1606-1610 in frequency 1604. In the first slot 1644, subband 1606 may be busy due to a forward booking resource. Subband 1608 may be determined as an available channel access instance. Subband 1610 may be unavailable as per LBT. Thus, 1 resource 1630 may be denoted as available and a backoff value may be decreased from 3 1636 to 2 1638. In the second slot 1646, subband 1612 may be busy due to a forward booking resource. Subband 1614 may be determined as an available channel access instance. Subband 1616 may be may be busy due to a forward booking resource. Thus, 1 resource 1632 may be denoted as available and a backoff value may be decreased from 2 1638 to 1 1640. In the third slot 1648, subband 1618 may be available. Subband 1620 may be available. Subband 1622 may be may be unavailable. Thus, 2 resources 1634 may be denoted as available and a backoff value may be decreased from 1 1640 to −1 1642. In the fourth slot 1650, subband 1624 may be available. Subband 1626 may be unavailable. Subband 1628 may be selected for transmission.

Figure 17:
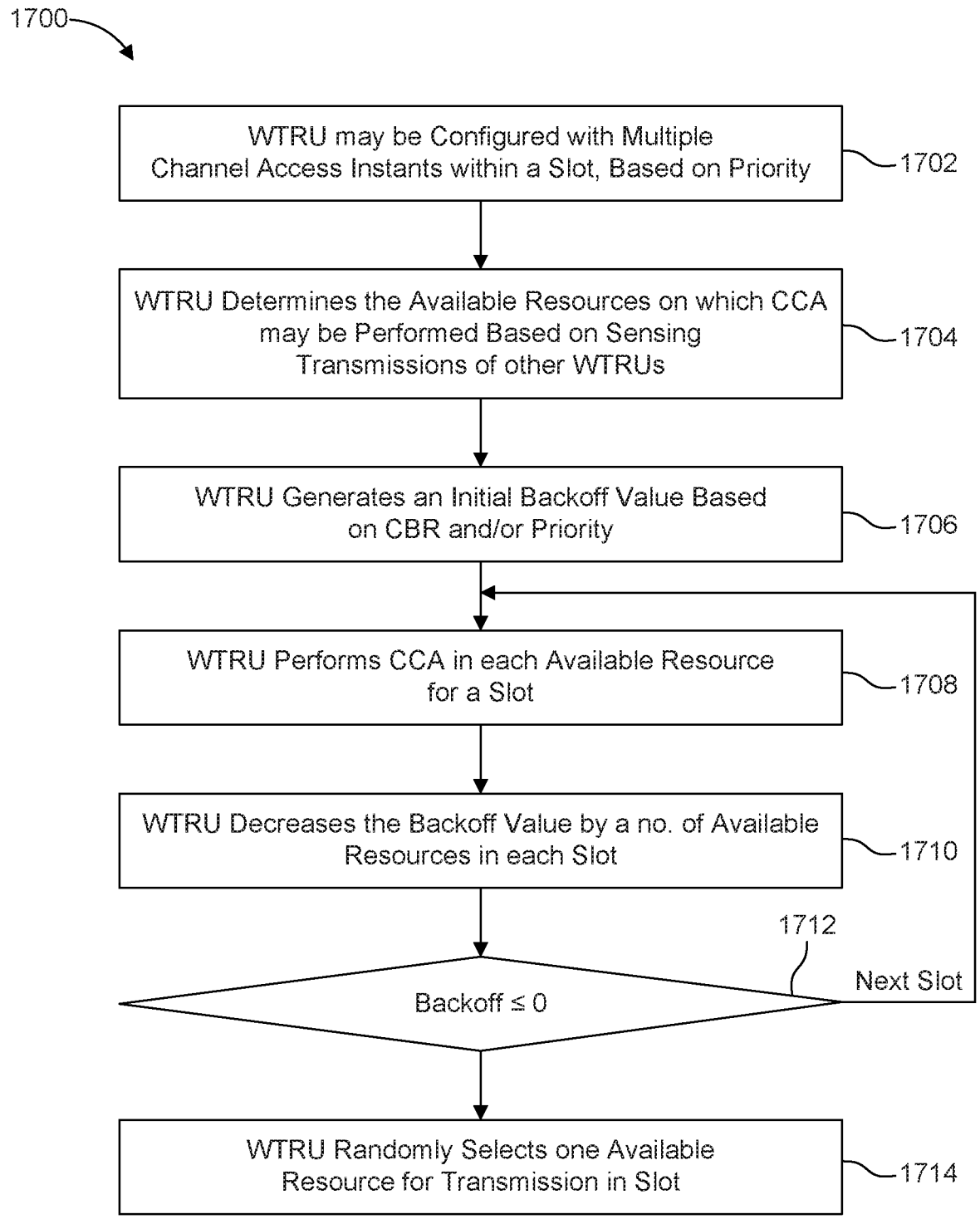
FIG. 17 is a flowchart which illustrates an example method for a WTRU to select a resource for transmission.

FIG. 17 is a flowchart 1700 which illustrates an example method for a WTRU to select a resource for transmission. The WTRU may be configured 1702 with multiple channel access instants within a slot based on a priority. The priority may be based on a data packet priority or another priority. The WTRU may determine 1704 the available resources on which CCA may be performed based on sensing transmissions of other WTRUs. The WTRU may generate 1706 an initial backoff value based on the performance of CBR and/or the priority. A CCA may be performed 1708 in each available resource for a slot. Each time an available resource is determined in a slot, the WTRU may decrease 1710 the backoff value accordingly, for example, the backoff value may be decreased by the number of available resources. When the backoff value is equal to or less than a threshold 1712, for example, 0, the WTRU may randomly select 1714 one available resource for transmission in a slot. Until the backoff value meets or exceeds the threshold, the WTRU may continue performing 1708 CCA.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a wireless transmit/receive unit (WTRU), the method comprising:
    transmitting first sidelink control information (SCI) which indicates one or more transmission resources;
    determining: (a) based on receiving an SCI from another WTRU, that the one or more transmission resources indicated by the first SCI overlap with one or more transmission resources associated with a higher priority reservation associated with the another WTRU and (b) that a sidelink reference signal received power (SL-RSRP) measurement is larger than an SL-RSRP threshold, wherein the determination that the SL-RSRP measurement is larger than the SL-RSRP threshold is based on receipt of the SCI from the another WTRU, and wherein the determination that the one or more transmission resources indicated by the SCI overlap with one or more transmission resources associated with a higher priority reservation associated with another WTRU is based on receiving the SCI from the another WTRU; and based on the determination, transmitting second SCI which indicates one or more different transmission resources;

wherein the SL-RSRP measurement is a measurement associated with a resource reserved by the another WTRU.

2. The method of claim 1, wherein the second SCI indicates a subset of the one or more transmission resources indicated by the first SCI.

3. The method of claim 1, wherein the SL-RSRP threshold is configured via higher layer signaling.

4. The method of claim 1, wherein the SL-RSRP threshold is configured via radio resource control (RRC) signaling.

5. A wireless transmit/receive unit (WTRU) comprising:
a transmitter; and
a processor;
wherein the transmitter and processor are configured to:
transmit first sidelink control information (SCI) which indicates one or more transmission resources;
determine, based on receiving an SCI from another WTRU, that the one or more transmission resources indicated by the first SCI overlap with one or more transmission resources associated with a higher priority reservation associated with the another WTRU and that a sidelink reference signal received power (SL-RSRP) measurement is larger than an SL-RSRP threshold, wherein the determination that the SL-RSRP measurement is larger than the SL-RSRP threshold is based on receipt of an SCI from the another WTRU, and wherein the determination that the one or more transmission resources indicated by the SCI overlap with one or more transmission resources associated with a higher priority reservation associated with another WTRU is based on receiving the SCI from the another WTRU; and based on the determination, transmit second SCI which indicates one or more different transmission resources;

wherein the SL-RSRP measurement is a measurement associated with a resource reserved by the another WTRU.

6. The WTRU of claim 5, wherein the determination to select one or more different transmission resources is further based on a determination that a sidelink reference signal received power (SL-RSRP) measurement is larger than a SL-RSRP threshold.

7. The WTRU of claim 6, wherein the SL-RSRP measurement is a measurement associated with a resource reserved by the another WTRU.

8. The WTRU of claim 6, wherein the determination that the SL-RSRP measurement is larger than the SL-RSRP threshold is based on receipt of an SCI from the another WTRU.

9. The WTRU of claim 5, wherein the processor is further configured to select one or more different transmission resources.

10. The WTRU of claim 5, wherein the determination that the one or more transmission resources indicated by the first SCI overlap with one or more transmission resources associated with a higher priority reservation associated with another WTRU is based on receiving an SCI from the another WTRU.

* * * * *